United States Patent
Nam

(10) Patent No.: US 11,010,460 B2
(45) Date of Patent: May 18, 2021

(54) METHOD FOR MANAGING CONTENTS AND ELECTRONIC DEVICE THEREOF

(71) Applicant: Samsung Electronics Co., Ltd., Gyeonggi-do (KR)

(72) Inventor: Doyeon Nam, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 15/860,823

(22) Filed: Jan. 3, 2018

(65) Prior Publication Data

US 2018/0189469 A1 Jul. 5, 2018

(30) Foreign Application Priority Data

Jan. 3, 2017 (KR) .................. 10-2017-0000626

(51) Int. Cl.
*G06F 21/32* (2013.01)
*H04W 12/06* (2021.01)
*G06F 21/45* (2013.01)
*H04L 29/06* (2006.01)

(52) U.S. Cl.
CPC .............. *G06F 21/32* (2013.01); *G06F 21/45* (2013.01); *H04L 63/083* (2013.01); *H04L 63/0861* (2013.01); *H04W 12/068* (2021.01); *G06F 2221/2131* (2013.01)

(58) Field of Classification Search
CPC .......... G06F 21/32; G06F 21/45; G06F 3/041; G06F 2203/04104; H04L 63/083; H04L 63/0861; G06K 9/00087; G06K 9/0004; G06Q 20/3674
See application file for complete search history.

(56) References Cited

U.S. PATENT DOCUMENTS

| | | |
|---|---|---|
| 2008/0221885 A1 | 9/2008 | Lin |
| 2008/0313470 A1 | 12/2008 | Pall |
| 2014/0013424 A1 | 1/2014 | Lv |
| 2014/0108656 A1* | 4/2014 | Salinca ................... G06F 9/505 709/226 |
| 2014/0109200 A1 | 4/2014 | Tootill et al. |
| 2014/0281568 A1 | 9/2014 | Ross et al. |
| 2015/0169859 A1 | 6/2015 | Wang |
| 2016/0285856 A1 | 9/2016 | Johansson |
| 2017/0019401 A1* | 1/2017 | Feder ..................... H04W 12/06 |

(Continued)

OTHER PUBLICATIONS

Justin Lee, Keeper password manager adds fingerprint authentication; biometricupdate.com. Nov. 19, 2015.

(Continued)

*Primary Examiner* — Kevin Bechtel
*Assistant Examiner* — Sangseok Park
(74) *Attorney, Agent, or Firm* — Cha & Reiter, LLC.

(57) ABSTRACT

An electronic device and method are disclosed herein. The electronic device includes a biometric sensor and at least one processor. The processor implements the method, including receiving biometric information through a biometric sensor electrically coupled with the electronic device, when the received biometric information is authenticated, detecting by a processor at least one content that correlates with the received biometric information, and outputting the detected at least one content that correlates with the biometric information.

14 Claims, 21 Drawing Sheets

(56) References Cited

U.S. PATENT DOCUMENTS

2017/0039414 A1* 2/2017 Sreenivas ............... G06F 21/32
2018/0107332 A1* 4/2018 Chan ..................... G06F 3/0414

OTHER PUBLICATIONS

Biometrics: Fingerprint Authentication on Your iOS Device; stickypassword.com. pp. 1-12.
European Search Report dated Apr. 30, 2018.
European Search Report dated Oct. 22, 2019.
European Search Report dated Dec. 2, 2020.

* cited by examiner

METHOD FOR MANAGING CONTENTS AND ELECTRONIC DEVICE THEREOF

CLAIM OF PRIORITY

This application claims the priority under 35 U.S.C. § 119(a) to Korean Patent Application Serial No. 10-2017-0000626, which was filed in the Korean Intellectual Property Office on Jan. 3, 2017, the entire content of which is hereby incorporated by reference.

TECHNICAL FIELD

Various embodiments of the present disclosure relate to a device and a method for managing contents using biometric information in electronic devices.

BACKGROUND

With the developments of information communication technology and semi-conductor technology, electronic devices have evolved to become multimedia devices providing various multimedia services. For example, the multimedia services may include at least one of a voice call service, a text-messaging service, a broadcasting service, a wireless Internet service, a camera service, or a music-playing service.

A user of an electronic device may obtain permission to use a web page or an application, and may input user identification information (e.g., ID) and a password in order to access the web page or application. For example, the electronic device may attempt to access the web page or application based on the user identification information and password received through a login screen of the application or web page. When the electronic device successfully accessed the web page or application, it may then output a service screen (e.g., a graphic user interface) of the corresponding web page or application.

SUMMARY

The total amount of user identification information and number of passwords, which must be managed by the user, may increase as the total number of applications and web pages, which are accessible by the user of the electronic device, increases. Hence, the user of the electronic device may face difficulties in managing the user identification information and passwords corresponding to the applications or web pages.

In order to resolve the problem above, the electronic device may store access information (e.g., user identification information and passwords) corresponding to web pages or applications. When a user wishes to access a specific web page or application, the electronic device may automatically provide at least one of the user identification information or a password based on the pre-stored access information.

However, the access information pre-stored in the electronic device can be easily accessed by unauthorized users, which may ultimately compromise the safety and security of personal information.

Various embodiments of the present disclosure may provide a device and method for managing contents using biometric information in the electronic device.

Various embodiments of the present disclosure may provide a device and method for managing user information (e.g., passwords) through fingerprint recognition in the electronic device.

According to various embodiments of the present disclosure, an electronic device is disclosed including a biometric sensor, at least one processor, and a memory electrically coupled to the at least one processor, stores instructions executable by the at least one processor to: receive biometric information through the biometric sensor, when the received biometric information is authenticated, detect at least one content that correlates with the received biometric information, and output the detected at least one content that correlates with the biometric information.

According to various embodiments of the present disclosure, a method in an electronic device is disclosed, including receiving biometric information through a biometric sensor electrically coupled with the electronic device, when the received biometric information is authenticated, detecting by a processor at least one content that correlates with the received biometric information, and outputting the detected at least one content that correlates with the biometric information.

BRIEF DESCRIPTION OF THE DRAWINGS

The above and other aspects and features of the present disclosure will be more apparent from the following detailed description taken in conjunction with the accompanying drawings, in which.

DETAILED DESCRIPTION

Figure 1:
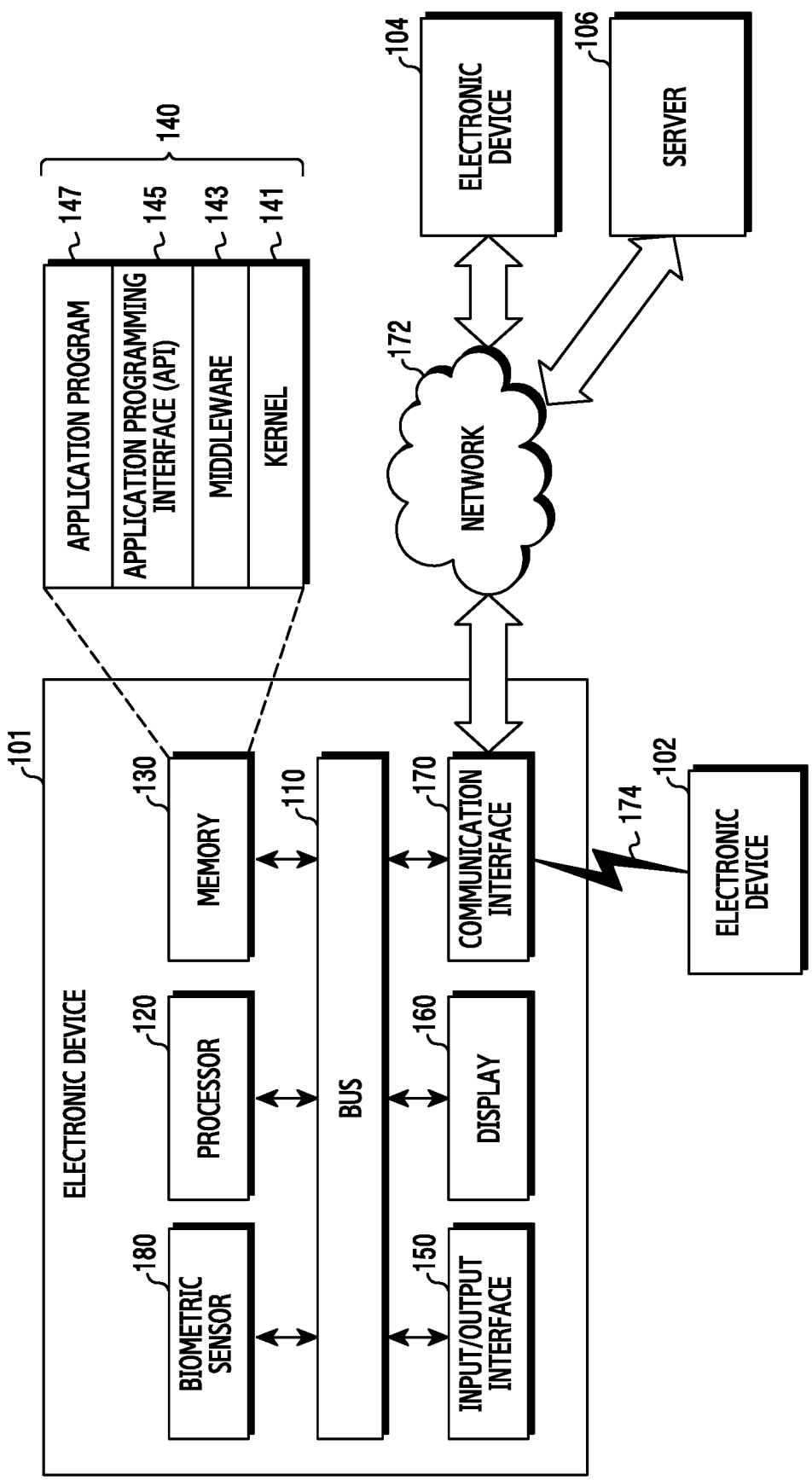
FIG. 1 illustrates an electronic device in a network environment according to various embodiments of the present disclosure.

Hereinafter, various example embodiments of the present document are described with reference to the accompanying drawings. It should be understood, however, that it is not intended to limit the various example embodiments of the present document to the particular form disclosed, but, on the contrary, it is intended to cover all modifications, equivalents, and alternatives falling within the various example embodiments of the present document. Like reference numerals denote like components throughout the drawings. A singular expression includes a plural concept unless there is a contextually distinctive difference therebetween.

In the present document, an expression "A or B", "A and/or B", or the like may include all possible combinations of items enumerated together. Although expressions such as "$1^{st}$", "$2^{nd}$", "first", and "second" may be used to express corresponding constitutional elements, it is not intended to limit the corresponding constitutional elements. When a certain (e.g., $1^{st}$) constitutional element is mentioned as being "operatively or communicatively coupled with/to" or "connected to" a different (e.g., $2^{nd}$) constitutional element, the certain constitutional element is directly coupled with/to another constitutional element or can be coupled with/to the different constitutional element via another (e.g., $3^{rd}$) constitutional element.

An expression "configured to" used in the present document may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic accessory, an electronic tattoo, a smart mirror, or a smart watch).

According to some embodiments, the electronic device (ex. home appliance) may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device (foldable device). Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

In the following description, contents may contain a user's personal information, which has been used or stored in the electronic device. For example, the contents may include at least one of user identification information (e.g., IDs), authentication information (e.g., passwords), application identification information, an address book, images, or a schedule.

FIG. 1 illustrates an electronic device 101 in a network environment according to various embodiments of the present disclosure.

Referring to FIG. 1, the electronic device 101 may include a bus 110, a processor 120 (e.g., including processing circuitry), a memory 130, an input/output interface 150 (e.g., including input/output circuitry), a display 160 (e.g., including display circuitry), a communication interface 170 (e.g., including communication circuitry), and a biometric sensor 180. In some embodiments, the electronic device 101 may exclude at least one element or may add other optional elements thereto.

The bus 110 may include a circuit for connecting the elements 120 to 180 with each other and transferring data (e.g., control messages or data) between the elements.

The processor 120 may include at least one of a central processing unit (CPU), an application processor (AP), a communication processor (CP), or an Image Signal Processor (ISP). The processor 120, for example, may process a calculation or data that is related to the control and/or communication of one or more other elements of the electronic device 101.

According to an embodiment, the processor 120 may perform control so as to match user's biometric information obtained through the biometric sensor 180 with at least one content and to thus store the same. For example, when the occurrence of a content registration event is detected, the processor 120 may control the display 160 so as to display a content registration screen. The processor 120 may perform control such that the memory 130 matches the contents received through the content registration screen with biometric information and stores the same therein. As an example, the processor 120 may identify whether or not the content registration event occurs based on at least one of a selection input in a content registration menu or a gesture input in response to the content registration event. For example, when the occurrence of a content registration event is detected, the processor 120 may detect contents corresponding to an application running in the electronic device 101. The processor 120 may perform control such that the memory 130 matches the biometric information obtained through the biometric sensor 180 with the contents corresponding to the application and stores the same therein. As an example, when the occurrence of a content registration event is detected, the processor 120 may extract contents corresponding to the application from an application execution screen (e.g., GUI) displayed on the display 160. For example, the contents corresponding to the application may contain at least one of identification information of the application, user identification information (e.g., ID) corresponding to the application, or authentication information (e.g., password) corresponding to the application. For example, the biometric information may include at least one piece of information on the user's iris, retina, fingerprint, or vein.

According to an embodiment, the processor 120 may perform control such that the user's biometric information is obtained through the biometric sensor 180. For example, when the occurrence of a biometric information acquisition event is detected, the processor 120 may activate the biometric sensor 180 for obtaining the biometric information. As an example, the processor 120 may determine that the biometric information acquisition event has occurred when a service screen for entering a password (e.g., a GUI for login) is displayed on the display 160. For example, the service screen for entering a password may include a virtual keypad. For example, when an application matched with the biometric information is executed, the processor 120 may control the biometric sensor 180 so as to be activated. As an example, the processor 120 may identify the application matched with the biometric information based on identification information of the application matched with the biometric information. For example, when a content request signal is received from external devices (e.g., the first external electronic device 102 or the second external electronic device 104) through the communication interface 170, the processor 120 may transmit an activation signal to the biometric sensor 180. As an example, when the authentication for the external device that transmitted the content request signal is successful, the processor 120 may transmit an activation signal to the biometric sensor 180.

According to an embodiment, the processor 120 may detect contents matched with the biometric information obtained through the biometric sensor 180. For example, in the case where the biometric information is obtained through the biometric sensor 180, the processor 120 may perform a user authentication process using the biometric information. If the user authentication is successful, the processor 120 may detect contents matched with the biometric information from the memory 130. For example, when a plurality of contents are matched with the biometric information obtained through the biometric sensor 180, the processor 120 may select contents corresponding to the application that is running in the electronic device 101 from the plurality of contents. For example, in the case where a plurality of pieces of biometric information are obtained through the biometric sensor 180, the processor 120 may detect contents matched with the respective pieces of the biometric information. The processor 120 may combine the contents matched with the plurality of pieces of biometric information in order to thereby create one content. For example, when a plurality of pieces of biometric information are obtained through the biometric sensor 180, the processor 120 may detect an input pattern of the biometric information. The processor 120 may detect contents matched with the input pattern of the biometric information from the memory 130. For example, the input pattern of the biometric information may include the input sequence (e.g. order of obtain, or acquisition sequence) of the biometric information of the same type (e.g. fingerprints) or the input sequence of the biometric information of different types. For example, the processor 120 may create one content through a combination of one or more contents provided from one or more external devices through the communication interface 170.

According to an embodiment, the processor 120 may perform control so as to output contents matched with the biometric information. For example, the processor 120 may control the display 160 so as to display contents matched with the biometric information. For example, the processor 120 may control the communication interface 170 so as to transmit the contents matched with the biometric information to external devices (e.g., the first external electronic device 102, the second external electronic device 104, or the server 106).

The memory 130 may include a volatile or non-volatile memory. For example, the memory 130 may store instructions or data in relation to one or more other elements of the electronic device 101. According to an embodiment, the memory 130 may store matching information of the biometric information and the contents.

According to an embodiment, the memory 130 may store software and/or programs 140. For example, the programs 140 may include a kernel 141, middleware 143, an application programming interface (API) 145, or an application programs (or "applications") 147. At least some of the kernel 141, the middleware 143, or the API 145 may be referred to as an operating system (OS).

The kernel 141, for example, may control or manage system resources (e.g., the bus 110, the processor 120, or the memory 130), which are used to execute the operation or function that is implemented in other programs (e.g., the middleware 143, the API 145, or the application programs 147). In addition, the kernel 141 may provide an interface by which the middleware 143, the API 145, or the application programs 147 may access each element of the electronic device 101 in order to thereby control or manage the system resources.

The middleware 143, for example, may play the intermediate role between the API 145 or the application programs 147 and the kernel 141 to communicate with each other for the transmission and reception of data. In addition, the middleware 143 may process one or more operation requests, which are received from the application programs 147, according to their priorities. For example, the middleware 143 may give priority for using the system resources (e.g., the bus 110, the processor 120, or the memory 130) of the electronic device 101 to at least one of the application programs 147, and may process one or more operation requests. The API 145 may be an interface by which the application programs 147 control functions that are provided by the kernel 141 or the middleware 143, and for example, may include one or more interfaces or functions (e.g., instructions) for file control, window control, image processing, or text control.

The input/output interface 150 may transfer instructions or data received from a user or other external devices to other elements of the electronic device 101. For example, the input/output interface 150 may include one or more physical buttons such as a home button, a power button, and a volume control button. For example, the input/output interface 150 may include a speaker for outputting audio signals and a microphone for collecting audio signals.

The display 160 may display a variety of contents (e.g., text, images, videos, icons, and/or symbols) to the user. The display 160, for example, may include a Liquid Crystal Display (LCD), a Light-Emitting Diode (LED) display, an Organic Light-Emitting Diode (OLED) display, a MicroElectroMechanical System (MEMS) display, or an electronic paper display.

The display 160 may include a display panel and a touch panel. For example, the display 160 may receive a touch input, a gesture input, a proximity input, or a hovering input using electronic pens or a user's body part through the touch panel. For example, the display panel and the touch panel may overlap, over all or at least in part, each other The communication interface 170, for example, may establish communication between the electronic device 101 and external devices (e.g., the first external electronic device 102, the second external electronic device 104, or the server 106). For example, the communication interface 170 may be connected to the network 172 through wireless or wired communication in order to thereby communicate with external devices (e.g., the second external electronic device 104 or the server 106).

According to an embodiment, the wireless communication may include a cellular communication that uses at least one of LTE, LTE-A (LTE-Advance), CDMA (code division multiple access), WCDMA (wideband CDMA), UMTS (universal mobile telecommunications system), WiBro (wireless broadband), GSM (global system for mobile communications), or the like. According to an embodiment, the wireless communication may include short-range communication 174 that uses at least one of Wi-Fi (wireless fidelity), Bluetooth, Bluetooth low-energy (BLE), Zigbee, NFC (near field communication), magnetic secure transmission, radio frequency (RF), or a body area network (BAN). According to an embodiment, the wireless communication may include GNSS. The GNSS, for example, may be a GPS (global positioning system), a GLONASS (global navigation satellite system), the Beidou navigation satellite system (hereinafter, "Beidou"), or Galileo (the European global satellite-based navigation system). Hereinafter, "GPS" may be used interchangeably with "GNSS" in the present specification. According to an embodiment, the wired communication may include at least one of a USB (universal serial bus), an HDMI (high-definition multimedia interface), RS-232 (recommended standard 232), power line communication, or a POTS (plain old telephone service). The network 172 may include at least one of telecommunication networks, such as a computer network (e.g., LAN or WAN), the Internet, or a telephone network.

The first and second external electronic devices 102 and 104 may be the same as or different from the electronic device 101 as to the type thereof. According to various embodiments, some or all of the operations that are executed by the electronic device 101 may be executed by one or more other electronic devices (e.g., the electronic device 102 or 104, or the server 106). According to an embodiment, in the case where the electronic device 101 executes a specific function or service automatically or upon request, the electronic device 101 may make a request to other devices (e.g., the electronic device 102 or 104, or the server 106) for at least some of the functions related to the function or service additionally, or instead of executing the same by itself. Other electronic devices (e.g., the electronic device 102 or 104, or the server 106) may execute the requested function or additional function, and may transfer the result thereof to the electronic device 101. The electronic device 101 may provide the requested function or service by providing the result without change or by further processing the same. To this end, for example, cloud computing, distributed computing, or client-server computing technology may be used.

The biometric sensor 180 may include at least one sensor for sensing or collecting the biometric information about the user of the electronic device 101. As an example, the biometric sensor 180 may include a fingerprint sensor for obtaining a fingerprint image of the user. For example, the fingerprint sensor may be positioned in at least a portion of the home button or display 160 of the electronic device 101. As an example, the biometric sensor 180 may include a vein recognition sensor for recognizing the shape of a blood vessel in a user's hand or wrist. For example, the vein recognition sensor may detect the shape of a user's blood vessel using infrared rays. As an example, the biometric sensor 180 may include an iris recognition sensor for detecting an iris pattern of an eye, which is unique for each person. As an example, the biometric sensor 180 may include a retina recognition sensor for detecting a capillary pattern of the retina. For example, the biometric sensor 180 may further include a control circuit for controlling at least one sensor.

Figure 2:
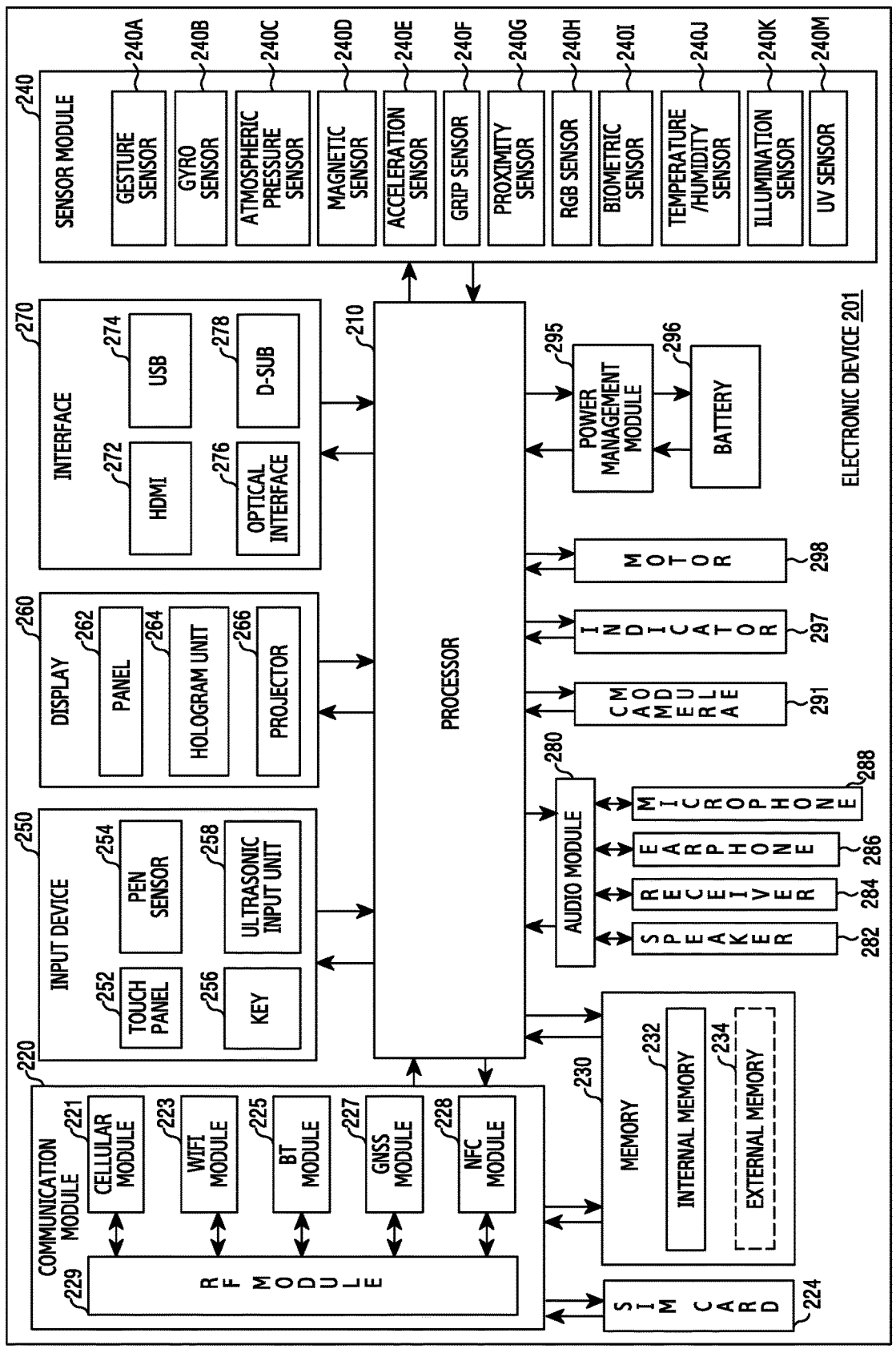
FIG. 2 illustrates a block diagram of an electronic device according to various embodiments of the present disclosure.

FIG. 2 illustrates a block diagram of an electronic device 201 according to various embodiments. The electronic device 201, for example, may include all or some of the elements of the electronic device 101 shown in FIG. 1. The electronic device 201 may include one or more processors 210 (e.g., AP), a communication module 220, a subscriber identification module 224, a memory 230, a sensor module 240, an input device 250, a display 260, an interface 270, an audio module 280, a camera module 291, a power management module 295, a battery 296, an indicator 297, or a motor 298.

The processor 210, for example, may control a multitude of hardware or software elements connected with the processor 210, and may perform the processing of various pieces of data and a calculation by executing an operating system or application programs. The processor 210 may be implemented as, for example, a system on chip (SoC). According to an embodiment, the processor 210 may further include a graphic processing unit (GPU) and/or an image signal processor (ISP). The processor 210 may include at least some (e.g., the cellular module 221) of the elements shown in FIG. 2. The processor 210 may load instructions or data received from one or more other elements (e.g., a non-volatile memory) to a volatile memory to then process the same, and may store the result data in a non-volatile memory.

According to an embodiment, the processor 210 may control the memory 230 so as to match a user's biometric information collected through a biometric sensor 240I with contents and to thus store the same therein. According to an embodiment, the processor 210 may perform control such that the contents matched with the biometric information are detected and output when the user's biometric information is obtained through the biometric sensor 240I.

The communication module 220 may have a configuration the same as or similar to that of the communication interface 170 of FIG. 1. The communication module 220, for example, may include a cellular module 221, a Wi-Fi module 223, a Bluetooth module 225, a GNSS module 227, an NFC module 228, and an RF module 229.

The cellular module 221, for example, may provide services of voice calls, video calls, text messaging, or the Internet through communication networks. According to an embodiment, the cellular module 221 may perform identification and authentication of the electronic device 201 in communication networks using the subscriber identification module 224 (e.g., a SIM card). According to an embodiment, the cellular module 221 may perform at least some of the functions provided by the processor 210. According to an embodiment, the cellular module 221 may include a communication processor (CP).

According to an embodiment, at least some (e.g., two or more) of the cellular module 221, the Wi-Fi module 223, the Bluetooth module 225, the GNSS module 227, or the NFC module 228 may be included in one integrated chip (IC) or one IC package.

The RF module 229, for example, may transmit and receive communication signals (e.g., RF signals). The RF module 229 may include, for example, a transceiver, a power amp module (PAM), a frequency filter, a low-noise amplifier (LNA), antennas, or the like. According to another embodiment, at least one of the cellular module 221, the Wi-Fi module 223, the Bluetooth module 225, the GNSS module 227, or the NFC module 228 may transmit and receive RF signals through a separate RF module. The subscriber identification module 224, for example, may include a card that adopts a subscriber identification module and/or an embedded SIM, and may contain inherent identification information {e.g., an integrated circuit card identifier (ICCID)} or subscriber information {e.g., an international mobile subscriber identity (IMSD)}.

The memory 230 (e.g., the memory 130 in FIG. 1) may include, for example, an internal memory 232 or an external memory 234. The internal memory 232, for example, may include at least one of volatile memories (e.g., a DRAM, an SRAM, an SDRAM, or the like) or non-volatile memories {e.g., an one-time programmable ROM (OTPROM), a PROM, an EPROM, an EEPROM, a mask ROM, a flash ROM, a flash memory, a hard drive, a solid state drive (SSD), or the like}. The external memory 234 may include a flash drive such as, for example, compact flash (CF), secure digital (SD), Micro-SD, Mini-SD, extreme digital (xD), a multimedia card (MMC), or a memory stick. The external memory 234 may be functionally or physically connected with the electronic device 201 through any of various interfaces.

The sensor module 240, for example, may measure physical quantities or may detect the operation state of the electronic device 201 to thereby convert the measured or detected information to electric signals. The sensor module 240 may include at least one of, for example, a gesture sensor 240A, a gyro-sensor 240B, an atmospheric pressure sensor 240C, a magnetic sensor 240D, an acceleration sensor 240E, a grip sensor 240F, a proximity sensor 240G, a color sensor 240H {e.g., a red-green-blue (RGB) sensor}, a biometric sensor 240I (e.g., the biometric sensor 180), a temperature/humidity sensor 240J, an illuminance sensor 240K, or an ultra-violet (UV) sensor 240M. Alternatively or additionally, the sensor module 240, for example, may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor as a part of the processor 210 or separately from the processor 210, which is configured to control the sensor module 240 in order to thereby control the sensor module 240 while the processor 210 is in a sleep mode.

The input device 250, for example, may include a touch panel 252, a (digital) pen sensor 254, keys 256, or an ultrasonic input device 258. The touch panel 252 may use at least one of, for example, a capacitive type, a pressure-sensitive type, an infrared type, or an ultrasonic type. In addition, the touch panel 252 may further include a control circuit. The touch panel 252 may further include a tactile layer in order to thereby provide a user with a tactile reaction. For example, the (digital) pen sensor 254 may be a part of the touch panel, or may include a separate recognition sheet. The keys 256 may include, for example, physical buttons, optical keys, or a keypad. The ultrasonic input device 258 may detect ultrasonic waves that are generated in the input means through a microphone (e.g., a microphone 288) to thereby identify data corresponding to the detected ultrasonic waves.

The display 260 (e.g., the display 160) may include a panel 262, a hologram device 264, a projector 266, and/or a control circuit for controlling the same. The panel 262 may be implemented to be, for example, flexible, transparent, or wearable. The panel 262 may be configured with the touch panel 252 as one or more modules. According to an embodiment, the panel 262 may include a pressure sensor (or force sensor) capable of obtaining pressure information on a user's touch (e.g., pressure coordinates and the intensity of pressure). The pressure sensor may be implemented integrally with the touch panel 252, or may be implemented using one or more sensors separately from the touch panel 252. According to an embodiment, the panel 262 may include a fingerprint sensor for detecting fingerprint information (e.g., fingerprint images) for a user's touch. The fingerprint sensor may be implemented integrally with the touch panel 252, or may be implemented using one or more sensors separately from the touch panel 252. The hologram device 264 may display 3D images in the air using light interference. The projector 266 may display images by projecting light onto a screen. The screen may be positioned, for example, inside or outside the electronic device 201. The interface 270 may include, for example, an HDMI 272, a USB 274, an optical interface 276, or a D-subminiature (D-sub) interface 278. The interface 270 may be included in, for example, the communication interface 170 shown in FIG. 1. Additionally or alternatively, the interface 270 may include, for example, a mobile high-definition link (MHL) interface, an SD card/multimedia card (MMC) interface, or an infrared data association (IrDA) standard interface.

The audio module 280, for example, may convert a sound into an electric signal, and vice versa. At least some elements of the audio module 280 may be included, for example, in the input/output interface 150 shown in FIG. 1. For example, the audio module 280 may process voice information that is input or output through a speaker 282, a receiver 284, earphones 286, or a microphone 288. The camera module 291, for example, may be a device for photographing still and moving images, and, according to an embodiment, may include one or more image sensors (e.g., a front sensor or a rear sensor), lenses, an image signal processor (ISP), or a flash (e.g., an LED or a xenon lamp). The power management module 295, for example, may manage the power of the electronic device 201. According to an embodiment, the power management module 295 may include a power management integrated circuit (PMIC), a charger IC, or a battery or fuel gauge. The PMIC may be implemented as a wired charging type and/or a wireless charging type. The wireless charging type may encompass, for example, a magnetic resonance type, a magnetic induction type, or an electromagnetic wave type, and additional circuits for wireless charging, such as coil loops, resonance circuits, or rectifiers, may be further provided. The battery gauge may measure, for example, the remaining power, a charging voltage, current, or temperature of the battery 296. The battery 296 may include, for example, a rechargeable battery and/or a solar battery.

The indicator 297 may display a specific state (e.g., a booting state, a messaging state, or a charging state) of the electronic device 201 or a part (e.g., the processor 210) thereof. The motor 298 may convert an electric signal to a mechanical vibration, and may provide a vibration or a haptic effect. The electronic device 201 may include a device (e.g., a GPU) for supporting mobile TV, which capable of processing media data according to standards, such as, for example, digital multimedia broadcasting (DMB), digital video broadcasting (DVB), or mediaFlo™. The respective elements described in the present specification may be configured using one or more components, and the names thereof may vary depending on the type of electronic device. According to various embodiments, the electronic device (e.g., the electronic device 201) may be configured by excluding some elements, by adding other elements thereto, or by combining some elements thereof into a single entity while performing functions the same as those performed before the combination.

Figure 3:
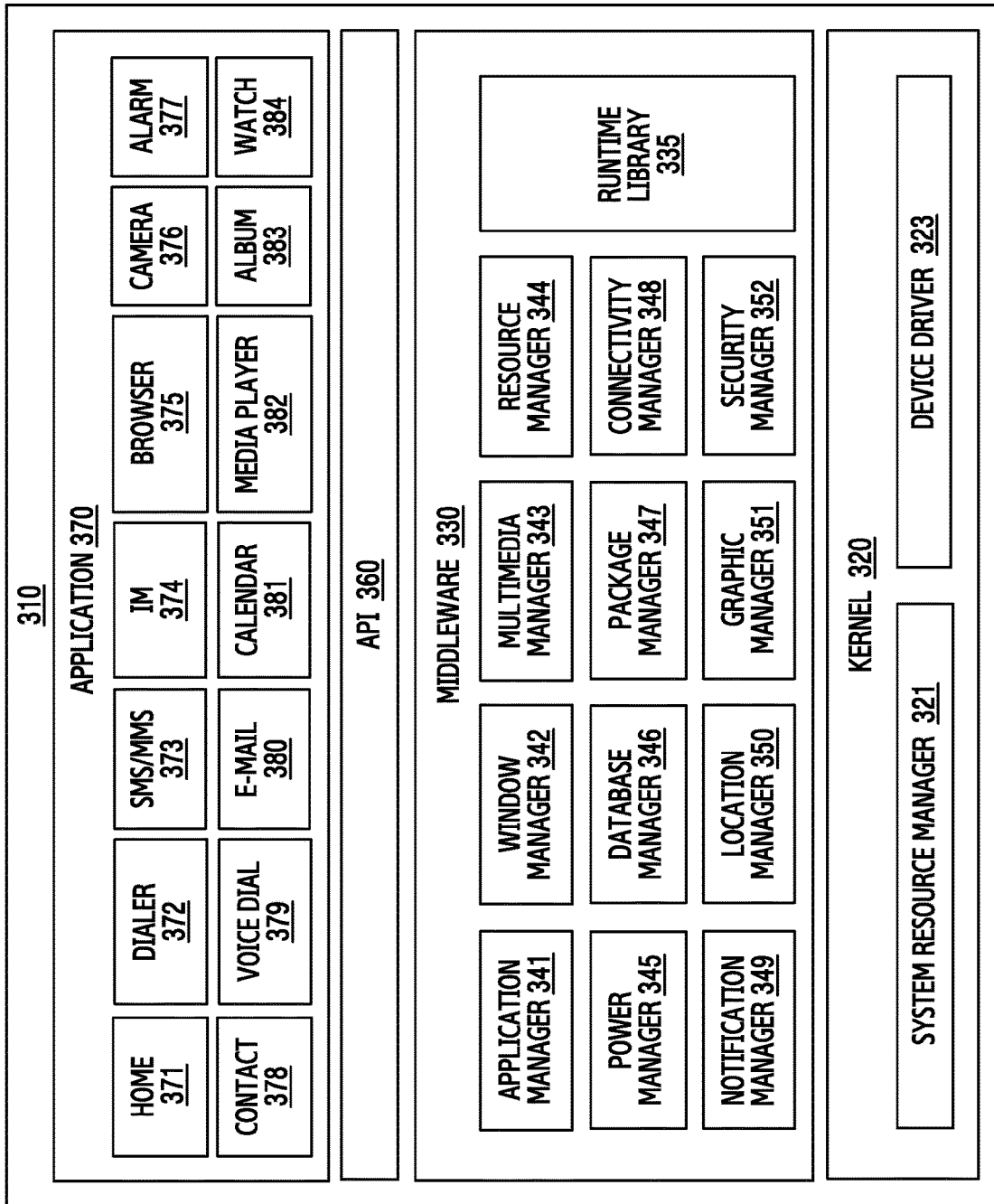
FIG. 3 illustrates a block diagram of a program module according to various embodiments of the present disclosure.

FIG. 3 is a block diagram of a program module, according to various embodiments. According to an embodiment, the program module 310 (e.g., the programs 140) may include an operating system for controlling resources related to the electronic device (e.g., the electronic device 101) and/or various applications (e.g., the application programs 147) operated under the operating system. For example, the operating system may be Android™, iOS™, Windows™, Symbian™, Tizen™, Bada™, or the like.

Referring to FIG. 3, the program module 310 may include a kernel 320 (e.g., the kernel 141), middleware 330 (e.g., the middleware 143), an API 360 (e.g., the API 145), or applications 370 (e.g., the application programs 147). At least some of the program module 310 may be preloaded in the electronic device, or may be downloaded from external electronic devices (e.g., the electronic devices 102 and 104 or the server 106).

The kernel 320, for example, may include a system resource manager 321 or a device driver 323. The system resource manager 321 may perform control, allocation, or collection of the system resources. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330, for example, may provide functions utilized in common for the applications 370, or may provide various functions to the applications 370 through the API 360 in order to allow the applications 370 to use the limited system resources in the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335, for example, may include a library module that a compiler uses in order to add new functions through programming languages while the applications 370 are being executed. The runtime library 335 may perform the input/output management, the memory management, or a function of an arithmetic calculation. The application manager 341, for example, may manage a life cycle of at least one of the applications 370. According to an embodiment, the application manager 341 may transmit a biometric information request signal to the security manager 352 based on the contents request of the applications 370. The application manager 341 may provide the applications 370 with contents information received from the database manager 346. The window manager 342 may manage a GUI resource used in the screen. The multimedia manager 343 may identify formats utilized for reproducing media files, and may perform encoding or decoding of media files using a codec corresponding to the format. The resource manager 344 may manage source codes or storage spaces of the applications 370. The power manager 345, for example, may manage the capacity or power of a battery, and may provide power information utilized for the operation of the electronic device. According to an embodiment, the power manager 345 may interwork with a basic input/output system (BIOS). The database manager 346, for example, may create, retrieve, or change a database to be used by the applications 370. According to an embodiment, the database manager 346 may retrieve the database to thus detect contents matched with the biometric information received from the security manager 352. The package manager 347 may manage the installation or update of the applications that are distributed in the form of a package file. The connectivity manager 348, for example, may manage a wireless connection. The notification manager 349 may provide the user with events such as received messages, appointments, or proximity notifications. The location manager 350, for example, may manage location information of the electronic device. The graphic manager 351, for example, may manage graphic effects to be provided to the user or the user interfaces related thereto. The security manager 352, for example, may provide a function of system security or user authentication. According to an embodiment, the security manager 352 may collect biometric information through the biometric sensor 180 based on a biometric information request signal received from the application manager 341.

According to an embodiment, the middleware 330 may include a telephony manager for managing voice or video calls of the electronic device or a middleware module capable of forming a combination of the functions of the above-described elements. According to an embodiment, the middleware 330 may provide a module that is specialized according to the type of operating system. The middleware 330 may dynamically exclude some of the typical elements or add new elements thereto. The API 360, for example, may be a group of API programming functions, and may be provided as different configurations according to the operating system. For example, one set of APIs may be provided to each platform in the case of Android or iOS, and two or more sets of APIs may be provided to each platform in the case of Tizen.

The applications 370, for example, may include applications of home 371, dialer 372, SMS/MMS 373, instant message (IM) 374, browser 375, camera 376, alarm 377, contacts 378, voice dialer 379, e-mail 380, calendar 381, media player 382, album 383, watch 384, healthcare (e.g., measuring the amount of exercise or blood glucose), providing environment information (e.g., providing atmospheric pressure, humidity, or temperature information), or the like. According to an embodiment, the applications 370 may include an information-exchange application capable of supporting the exchange of information between the electronic device and the external electronic devices. The information-exchange application, for example, may include a notification relay application for relaying specific information to the external electronic devices, or may include a device management application for managing the external electronic devices. For example, the notification relay application may transfer notification information generated from other applications of the electronic device to the external electronic device, or may receive notification information from the external electronic device to thus provide the same to the user. The device management application, for example, may install, delete, or update the functions {e.g., turning on and off the external electronic device (or some elements thereof) or adjusting the brightness (or resolution) of a display} of the external electronic device that communicates with the electronic device or the applications executed in the external electronic device. According to an embodiment, the applications 370 may include applications that are designated according to the attributes of the external electronic device (e.g., a healthcare application for a mobile medical device). According to an embodiment, the applications 370 may include applications that are received from the external electronic device. At least some of the program module 310 may be implemented (e.g., executed) by software, firmware, hardware (e.g., the processor 210), or a combination thereof, and may include modules, program routines, sets of instructions, or processors for executing one or more functions.

According to various embodiments of the present disclosure, an electronic device may include: a biometric sensor; at least one processor; and a memory electrically coupled to the at least one processor, stores instructions executable by the at least one processor to: receive biometric information through the biometric sensor; when the received biometric information is authenticated, detect at least one content that correlates with the received biometric information; and output the detected at least one content that correlates with the biometric information.

According to various embodiments, the biometric sensor may be configured to detect at least one of a fingerprint, an iris, a retina, or a vein.

According to various embodiments, the instructions are further executable by the at least one processor to activate the biometric sensor in response to detecting an event in which biometric information is to be acquired.

According to various embodiments, the electronic device may further include a communication interface, wherein the instructions are further executable by the at least one processor to activate the biometric sensor when a content request signal is received through the communication interface.

According to various embodiments, the instructions are further executable by the at least one processor to: identify an application executing on the electronic device; and detect at least one content matching the application and the received biometric information.

According to various embodiments, wherein the received biometric information includes a plurality of biometric markers, and wherein the instructions are further executable by the at least one processor to: detect contents matching each respective biometric marker; and generate a new content based on the detected contents.

According to various embodiments, the instructions are further executable by the at least one processor to: when a plurality of biometric markers are received through the biometric sensor, detect an input pattern corresponding to the plurality of biometric markers; and detect contents corresponding to the detected input pattern.

According to various embodiments, wherein the input pattern comprises at least one of an acquisition sequence of the plurality of biometric markers, and a type of biometric information for each of the plurality of biometric markers.

According to various embodiments, the electronic device may further include a display, and the instructions are further executable by the at least one processor to control the display do display the contents matching the biometric information.

According to various embodiments, the electronic device may further include a communication interface, and the instructions are further executable by the at least one processor to control the communication interface to transmit the contents matching the biometric information to an external device.

Figure 4:
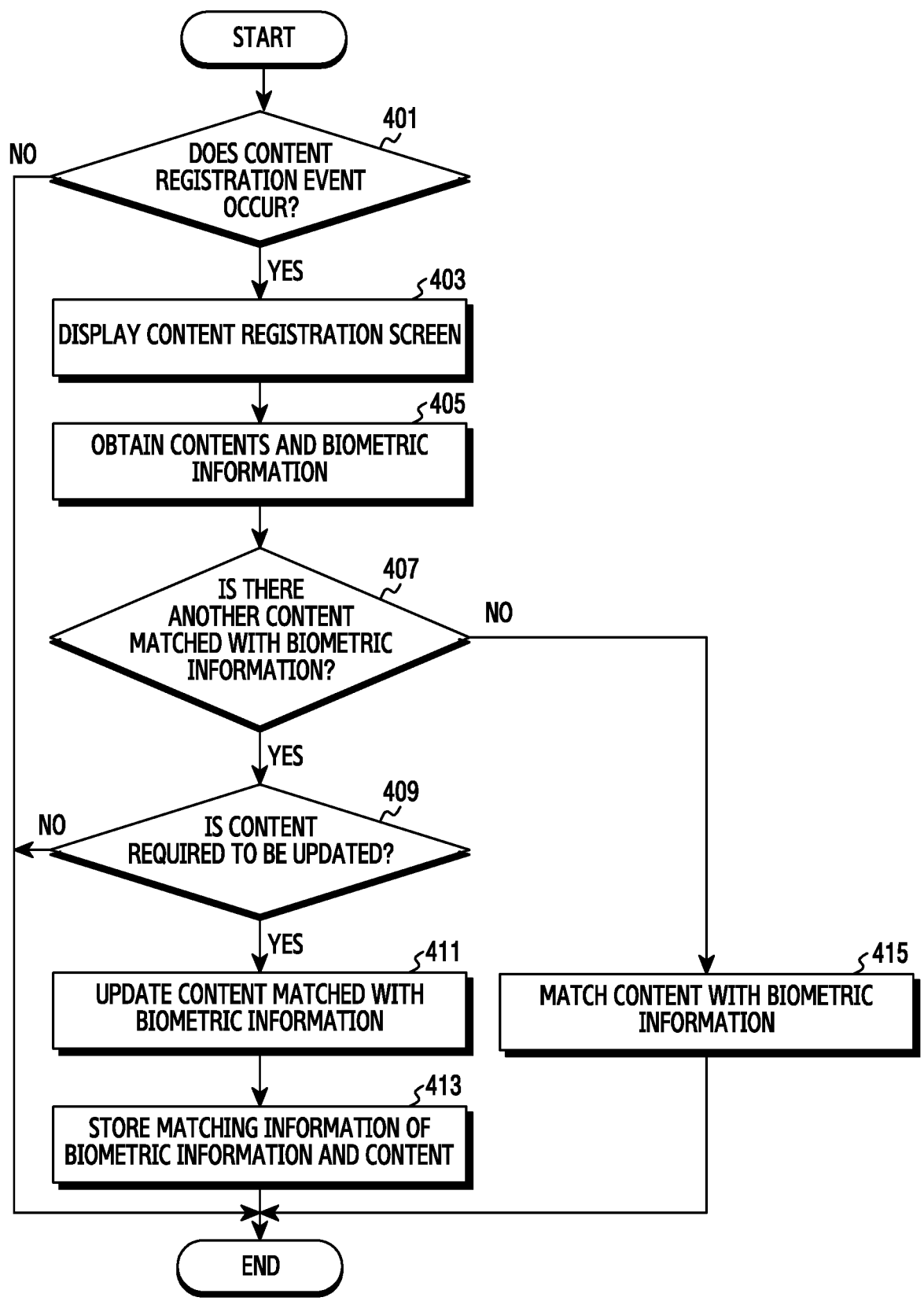
FIG. 4 illustrates a flowchart for matching biometric information with contents in the electronic device according to various embodiments of the present disclosure.
Figure 5A:
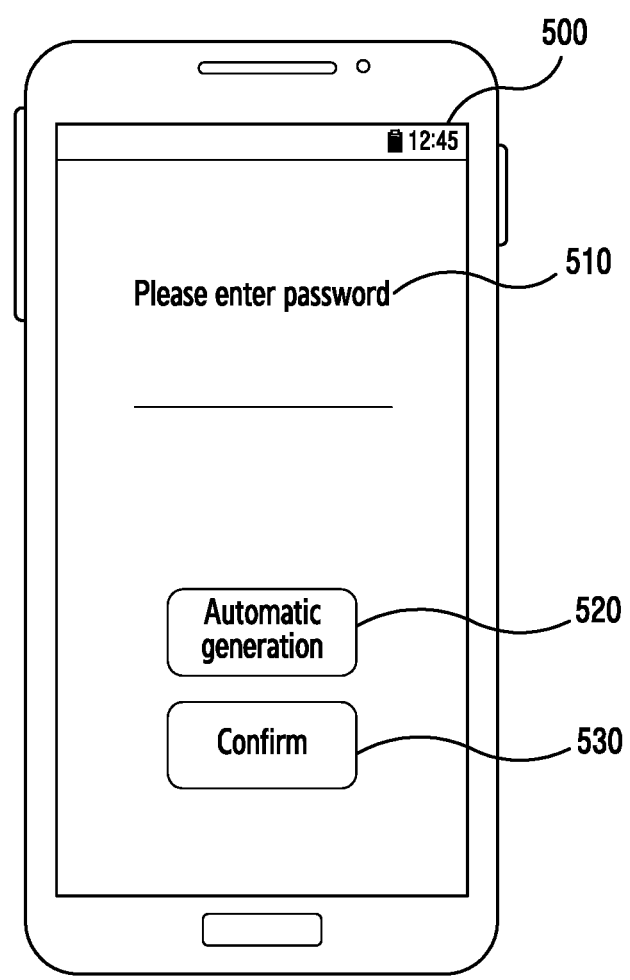
FIG. 5A and FIG. 5B illustrate screen configurations for matching biometric information with contents in the electronic device according to various embodiments of the present disclosure.
Figure 5B:
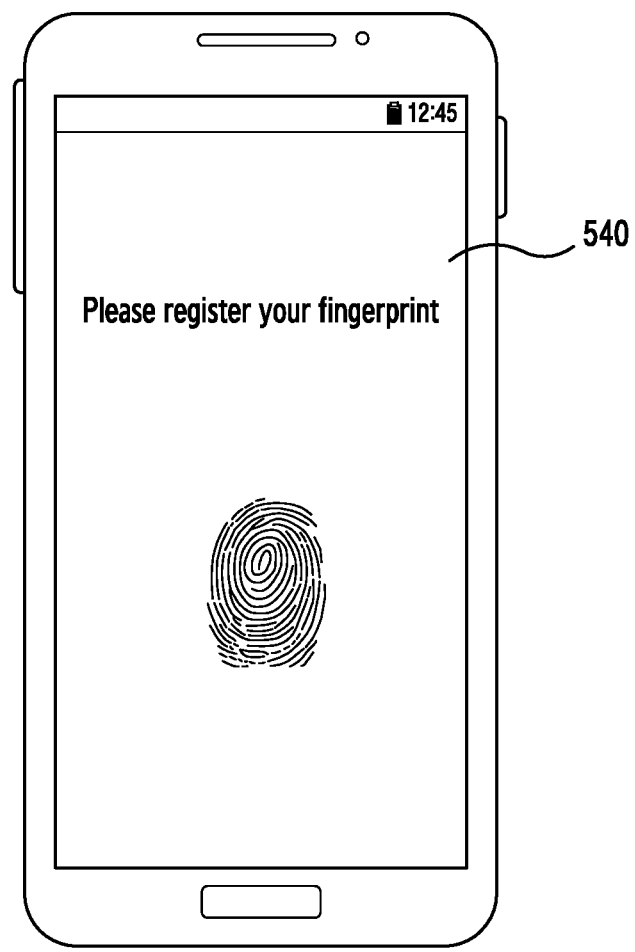

FIG. 4 illustrates a flowchart for matching biometric information with contents in the electronic device according to various embodiments of the present disclosure, and FIGS. 5A and 5B illustrate screen configurations for correlating biometric information with accessible content on the electronic device according to various embodiments of the present disclosure. In the following description, the electronic device may include at least some elements (e.g., the processor 120) of the electronic device 101 of FIG. 1.

Referring to FIG. 4, the electronic device may verify whether or not a content registration event has occurred in operation 401. For example, the processor 120 may verify whether or not a user input is detected to a content registration menu displayed in at least a portion of the display 160. When a user input corresponding to the content registration menu is detected, the processor 120 may determine that the content registration event has occurred. For example, the processor 120 may verify whether or not a gesture input corresponding to a content registration event is detected through a sensor (e.g., the sensor module 240 in FIG. 2), which is electrically connected to the electronic device 101. When a gesture input corresponding to the content registration event is detected, the processor 120 may determine that a content registration event has occurred.

When it is determined that a content registration event has occurred, the electronic device may display a service screen for facilitating content registration on the display in operation 403. For example, the processor 120 may control the display 160 to display a service screen 500 for registering a password to be correlated with the biometric information, as shown in FIG. 5A. For example, the processor 120 may cause the display 160 to display a service screen 540 for registering an image of a fingerprint to be correlated with the contents, as shown in FIG. 5B.

The electronic device may acquire the contents and the biometric information to be correlated based on the service screen for content registration in operation 405. For example, the processor 120 may identify a password (content) to be matched with the biometric information based on a user input in response to the service screen 500 as shown in FIG. 5A. As an example, the processor 120 may obtain a password to be matched with the biometric information based on a user input received through a virtual keypad (not shown). As an example, the processor 120 may automatically generate a password to be matched with the biometric information based on an input onto an automatic generation icon 520. For example, the processor 120 may automatically and arbitrarily generate a password, or may automatically generate a password through a predefined password generation pattern or program. As an example, the processor 120 may control the display 160 so as to display a password to be matched with the biometric information on a password display area 510. For example, the processor 120 may acquire a fingerprint image of the user through the biometric sensor 180 (e.g., a fingerprint sensor) while the service screen 540 is being displayed as shown in FIG. 5B. For example, the processor 120 may control the display 160 so as to display the service screen 540 requesting fingerprint registration as shown in FIG. 5B when the input of a password is completed through the service screen 500 as shown in FIG. 5A. For example, the processor 120 may determine the completion of a password input based on a selection input onto the confirmation icon 530. For example, the processor 120 may control the display 160 so as to display the service screen 500 requesting password registration as shown in FIG. 5A when a fingerprint image to be matched with the contents has been registered through the service screen 540 as shown in FIG. 5B.

The electronic device may verify whether another content has previously been correlated with the biometric information in operation 407. For example, the processor 120 may verify the existence of matching or correlation information corresponding to the biometric information obtained in operation 405 from a matching table stored in the memory 130.

If another content has previously been matched or correlated with the biometric information, the electronic device may determine whether or not the content correlated with the biometric information should be updated in operation 409. For example, if another content has previously been correlated with the biometric information, the processor 120 may control the display 160 to display a notification window in order to notify a user of the presence of a conflict with another content. The processor 120 may determine whether or not the content correlated with the biometric information should be updated based on a user input in response to the notification window. For example, the processor 120 may determine the validity of another content that has previously been correlated with the biometric information. If it is determined that another content correlated with the biometric information is valid, the processor 120 may determine to maintain the correlation of the another content with the biometric information. For example, when a valid period of the another content has expired, the processor 120 may determine that the corresponding content is invalid, and if the valid time thereof has not yet expired, the processor 120 may determine that the content is valid. For example, the processor 120 may verify whether or not the content, which has previously been matched with the biometric information, is the same as the content to be matched with the biometric information. If the content is different from the content to be presently correlated or matched with the biometric information, the processor 120 may determine to update the content matched with the biometric information.

If it is determined that the content matched with the biometric information is utilized to be updated, the electronic device may replace the content, which has previously been matched with the biometric information, by a newly obtained content in operation 411. For example, the processor 120 may replace the password matched with the fingerprint image obtained through the service screen 540 of FIG. 5B by a password obtained through the service screen 500 of FIG. 5A.

The electronic device may store the update information of the content matched with the biometric information in operation 413. For example, the processor 120 may control the memory 130 or the server 106 such that the content matched with the biometric information is updated in the matching table stored in the memory 130.

If there is no content that has previously been matched with the biometric information, the electronic device may match the biometric information with the content and store the same in operation 415. For example, the processor 120 may control the memory 130 so as to add matching information of the biometric information and the content obtained in operation 405 to the matching table stored in the memory 130.

According to an embodiment, the electronic device may match a plurality of contents with one piece of biometric information. In this case, the electronic device may omit operations 407 to 413 in FIG. 4. For example, in the case a plurality of contents are matched with one piece of biometric information, the processor 120 may control the memory 130 so as to further store additional information for identifying the respective contents (e.g., application identification information).

Figure 6:
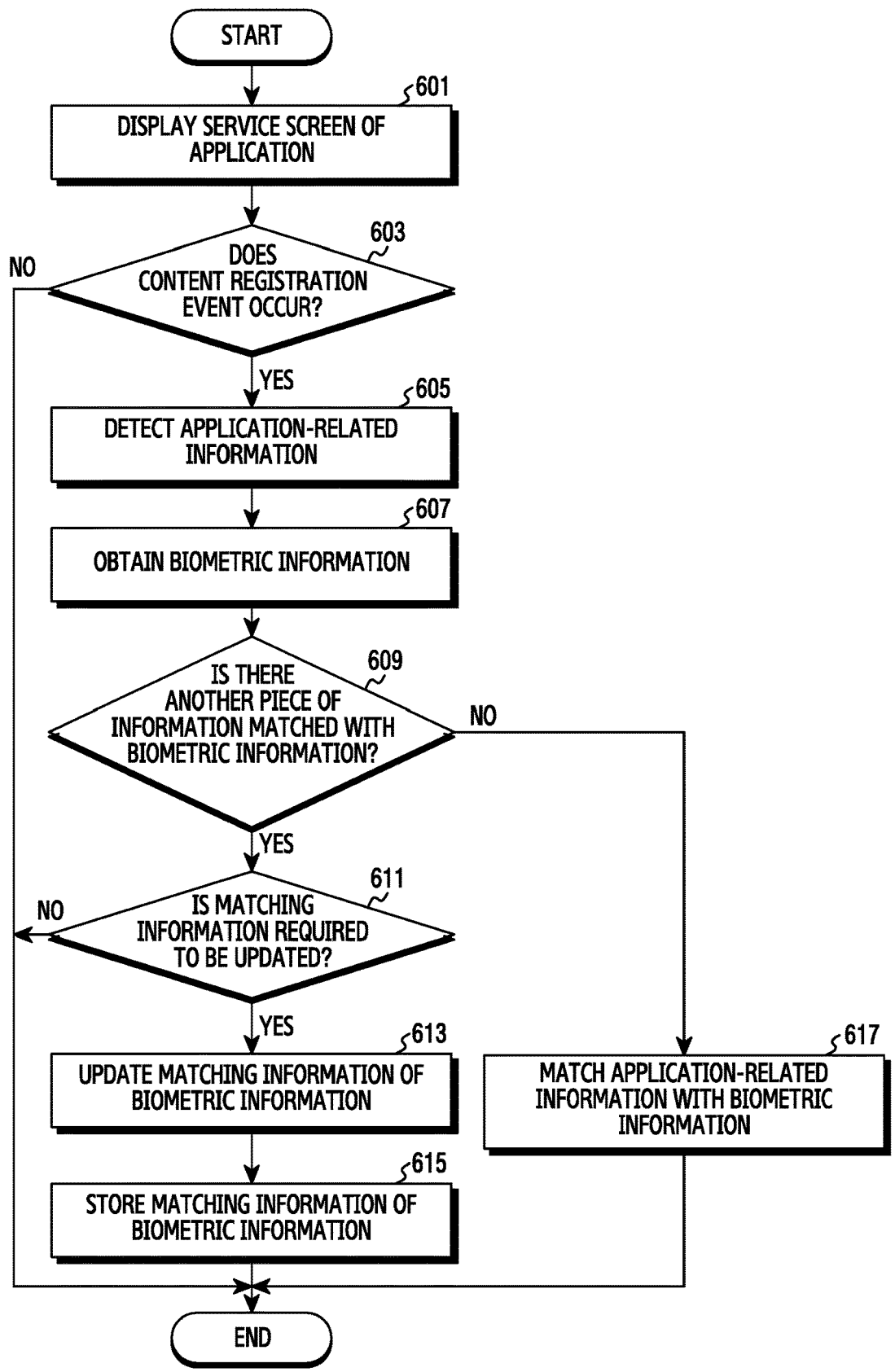
FIG. 6 illustrates a flowchart for matching biometric information with application information in the electronic device according to various embodiments of the present disclosure.
Figure 7:
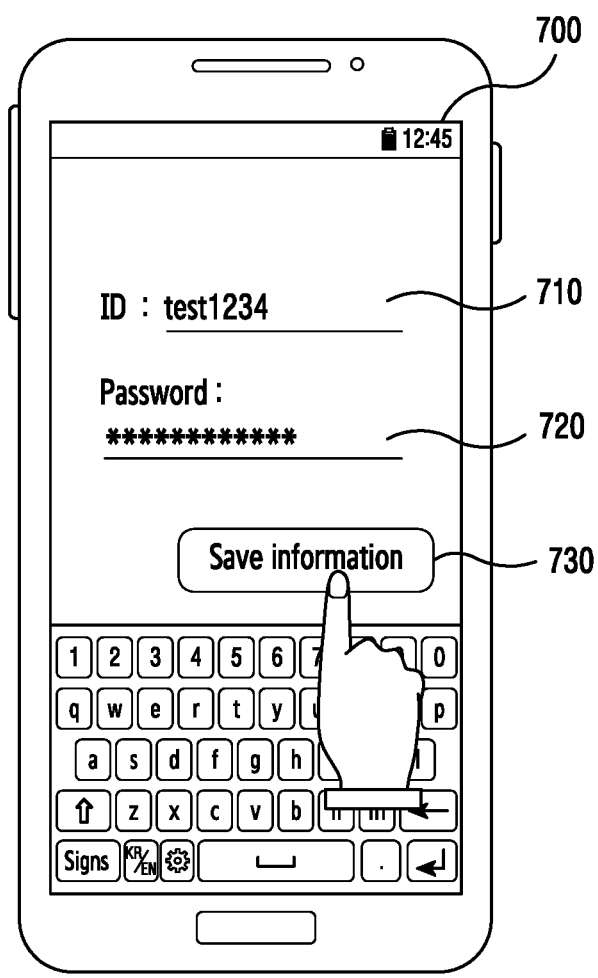
FIG. 7 illustrates a screen configuration for detecting application information in the electronic device according to various embodiments of the present disclosure.

FIG. 6 illustrates a flowchart for matching biometric information with application information in the electronic device according to various embodiments of the present disclosure. FIG. 7 illustrates a screen configuration for detecting application information in the electronic device according to various embodiments of the present disclosure. In the following description, the electronic device may include at least some elements (e.g., the processor 120) of the electronic device 101 of FIG. 1.

Referring to FIG. 6, the electronic device may display, in at least a portion of the display, a service screen for an application running in the electronic device in operation 601. For example, the processor 120 may execute an application corresponding to a user input or a control signal received through the communication interface 170, among a plurality of applications installed in the electronic device 101. In this case, the processor 120 may control the display 160 so as to display a service screen of the application, such as one including a graphical user interface (GUI). As an example, the processor 120 may control the display 160 so as to display a login screen 700 of the application as shown in FIG. 7.

The electronic device may verify whether or not a content registration event has occurred in operation 603. For example, the processor 120 may verify whether or not a selection input corresponding to an information-saving icon 730 is detected in the login screen 700 of the application displayed on the display 160, as shown in FIG. 7. As an example, when a selection input corresponding to the information-saving icon 730 is detected, the processor 120 may determine that the content registration event has occurred.

If it is determined that the content registration event has occurred, the electronic device may detect information associated with the application from the service screen of the application in operation 605. For example, the processor 120 may detect a user ID and a password for the application, which are displayed in an ID input area 710 and a password input area 720 of the login screen 700 in FIG. 7. The processor 120 may further detect identification information of the application.

The electronic device may obtain biometric information to be correlated or matched with the information associated with the application in operation 607. For example, when the information associated with the application is obtained from the service screen of the application, the processor 120 may obtain a user's fingerprint image through the biometric sensor 180 (e.g., the fingerprint sensor). As an example, when the information associated with the application is obtained from the service screen of the application, the processor 120 may control the display 160 so as to display the service screen 540 requesting fingerprint registration so that the user may recognize the registration time of the fingerprint image, as shown in FIG. 5B.

The electronic device may verify whether or not there is another content that has previously been matched with the biometric information to be matched or correlated with the information associated with the application in operation 609. For example, the processor 120 may verify whether or not there is matching information corresponding to the biometric information obtained in operation 607 from the matching table stored in the server 106.

If there is another content that has previously been matched with the biometric information, the electronic device may determine whether or not the content matched with the biometric information should be updated in operation 611. For example, the processor 120 may determine whether or not the content matched with the biometric information should be updated based on a user input obtained through the input/output interface 150 or the display 160 (e.g., the touch panel).

If it is determined that the content matched with the biometric information should be updated, the electronic device may replace the information associated with another application, which has previously been matched with the biometric information, with the newly obtained application-related information in operation 613.

The electronic device may store the updated matching information for the biometric information in operation 615. For example, the processor 120 may control the server 106 such that the content information matched with the biometric information is replaced by the application-related information obtained in operation 607 in the matching table stored in the server 106.

If there is no content that has previously been matched with the biometric information, the electronic device may generate the correlation or the matching of the biometric information and the application-related information in operation 617, and store information corresponding to the same. For example, the processor 120 may control the server 106 so as to add the matching information to the matching table stored in the server 106, and the matching information indicates the correlation or matching between the biometric information obtained in operation 607 and the application-related information obtained in operation 605. For example, the application-related information may include application identification information, and user identification information and authentication information corresponding to the application.

According to an embodiment, the electronic device may match multiple application-related information pieces with one piece of biometric information. In this case, the electronic device may omit operations 609 to 615 in FIG. 6. For example, the processor 120 may identify a plurality of contents matched with one piece of biometric information using the application identification information.

Figure 8:
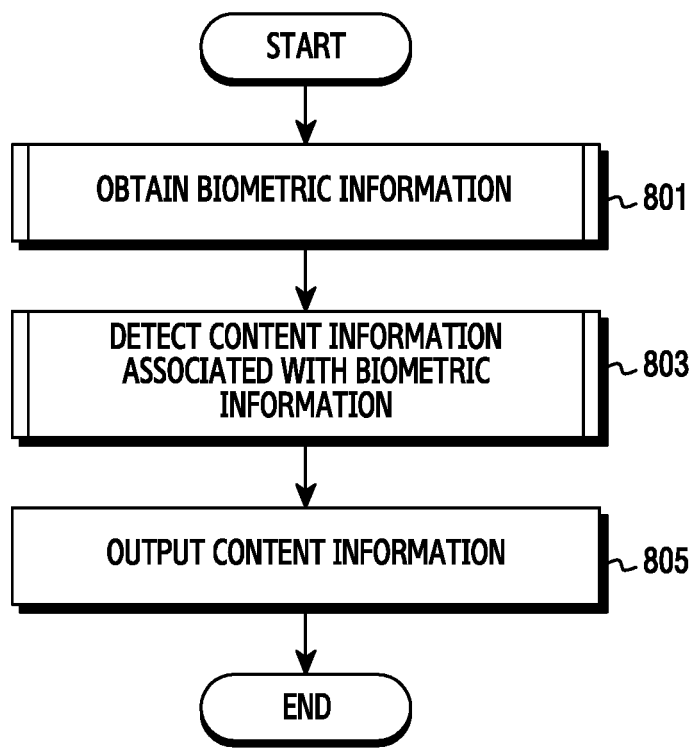
FIG. 8 illustrates a flowchart for outputting contents corresponding to the biometric information in the electronic device according to various embodiments of the present disclosure.
Figure 9A:
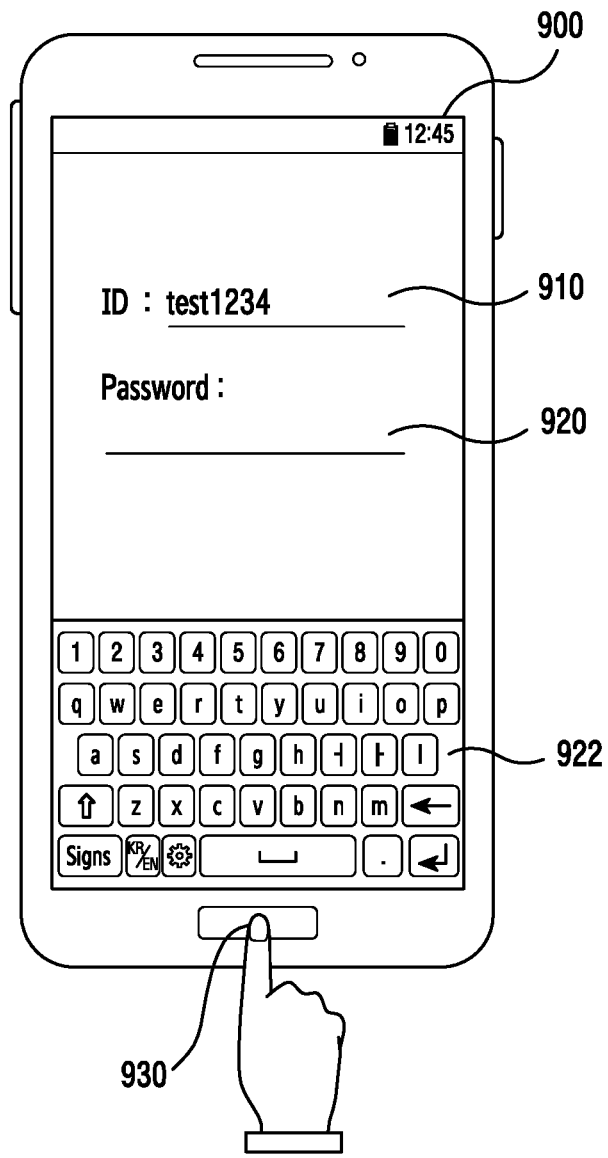
FIG. 9A and FIG. 9B illustrate screen configurations for outputting contents corresponding to the biometric information in the electronic device according to various embodiments of the present disclosure.
Figure 9B:
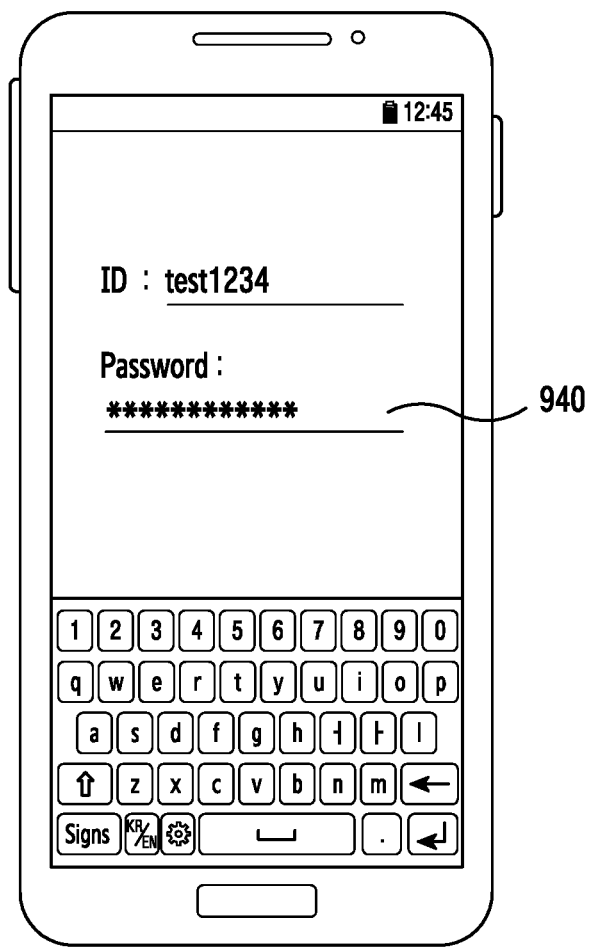

FIG. 8 illustrates a flowchart for outputting contents corresponding to the biometric information in the electronic device according to various embodiments of the present disclosure. FIGS. 9A and 9B illustrate screen configurations for outputting contents corresponding to the biometric information in the electronic device according to various embodiments of the present disclosure. In the following description, the electronic device may include at least some elements (e.g., the processor 120) of the electronic device 101 of FIG. 1.

Referring to FIG. 8, in operation 801, the electronic device may obtain a user's biometric information using a biometric sensor electrically connected or otherwise coupled to the electronic device. For example, when it is determined that an event for biometric information acquisition has occurred, the processor 120 may activate the biometric sensor 180 to thus obtain the user's biometric information. As an example, when a login screen 900 for an application or web page is displayed on the display 160 as shown in FIG. 9A, the processor 120 may determine that the event for biometric information acquisition has occurred. For example, the login screen 900 may include an ID input area 910 and a password input area 920. As an example, when an application matched with the biometric information is executed, the processor 120 may determine that the event for biometric information acquisition has occurred. As an example, when a content request signal is received from an external device, the processor 120 may determine that the event for biometric information acquisition has occurred. For example, when it is determined that the content request signal received from the external device is valid, the processor 120 may determine that the event for biometric information acquisition has occurred.

The electronic device may detect content information associated with the biometric information in operation 803. For example, the processor 120 may execute a user authentication process using the biometric information. If the user authentication process is successful, the processor 120 may detect content information matched with the biometric information from the matching table stored in memory 130 or the server 106. As an example, in an example where there are a plurality of contents matched with the biometric information, the processor 120 may select content corresponding to the application running in the electronic device 101 from among a plurality of contents. For example, the processor 120 may create a single content by combining the contents matched with a plurality of pieces of biometric information obtained through the biometric sensor 180. For example, the processor 120 may detect the content matched with an input pattern of the biometric information obtained through the biometric sensor 180.

The electronic device may output content information associated with the biometric information in operation 805. For example, the processor 120 may control the display 160 so as to display content information matched with the biometric information. As an example, when a password matched with a fingerprint image is detected, the processor 120 may control the display 160 so as to display the password matched with the fingerprint image in the password input area 920 of the login screen 900 displayed on the display 160 (see 940), as shown in FIG. 9B. As an example, the processor 120 may control the communication interface 170 so as to transmit login information (the ID and password) contained in the login screen 900 to an authentication server. For example, the processor 120 may also control the communication interface 170 so as to transmit content information matched with the biometric information to at least one external device that has transmitted the content request signal to the electronic device 101.

Figure 10:
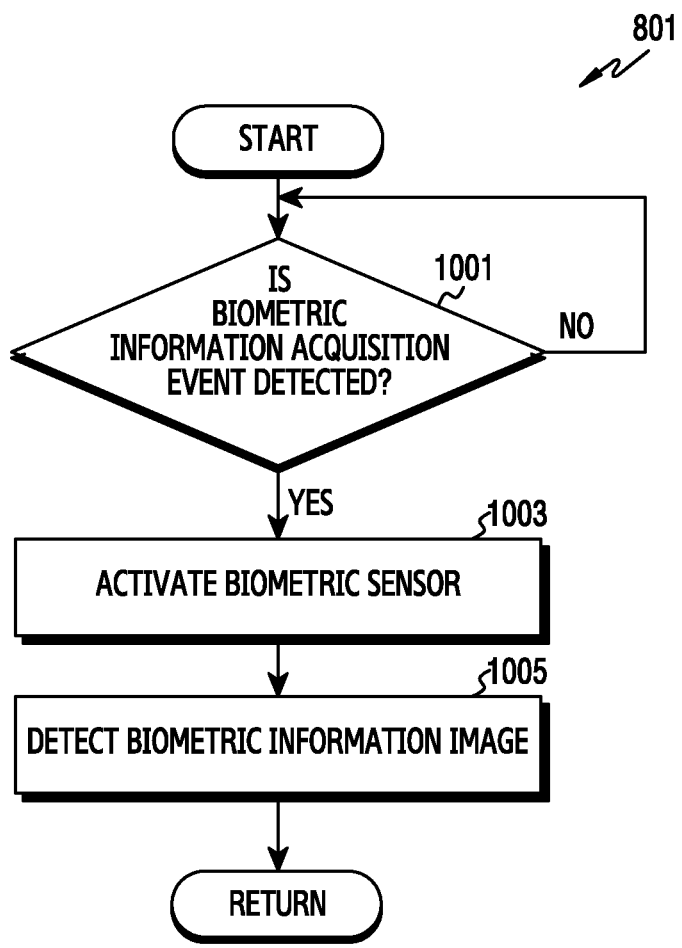
FIG. 10 illustrates a flowchart for detecting biometric information in the electronic device according to various embodiments of the present disclosure.

FIG. 10 illustrates a flowchart for detecting biometric information in the electronic device according to various embodiments of the present disclosure. The following description expands on the operation of obtaining the biometric information as described in operation 801 of FIG. 8. In the following description, the electronic device may include at least some elements (e.g., the processor 120) of the electronic device 101 of FIG. 1.

Referring to FIG. 10, the electronic device may verify whether or not a biometric information acquisition event has occurred in operation 1001. For example, the processor 120 may control the display 160 so as to display the login screen 900 for logging on to an application or web page, as shown in FIG. 9A. When the occurrence of an event for displaying a virtual keypad is detected, the processor 120 may control the display 160 so as to display a virtual keypad 922 in at least a portion of the login screen 900. When the virtual keypad 922 is displayed, the processor 120 may determine that the password can be entered and a biometric information acquisition event has occurred. As an example, when a user input corresponding to the password input area 920 of the login screen 900 is detected, the processor 120 may determine that the event for displaying a virtual keypad has occurred.

If the electronic device fails to detect the occurrence of the biometric information acquisition event, the electronic device may periodically or continuously verify whether or not the occurrence of the biometric information acquisition event is detected in operation 1001.

When the occurrence of the biometric information acquisition event is detected, the electronic device may activate a biometric sensor electrically connected to the electronic device in operation 1003. For example, the processor 120 may control the biometric sensor 180 to remain inactive if it is determined to not obtain the biometric information in order to reduce power consumption of the electronic device 101. When the occurrence of the biometric information acquisition event is detected, the processor 120 may control the biometric sensor 180 to be activated in order to obtain the biometric information.

The electronic device may obtain a user's biometric information using the activated biometric sensor in operation 1005. For example, the processor 120 may obtain a user's fingerprint image using a fingerprint sensor included in the home button 930, as shown in FIG. 9A.

According to an embodiment, when the user's biometric information is obtained (e.g., operation 1005 in FIG. 10), the electronic device may detect content information associated with the obtained biometric information of the user (e.g., operation 803 in FIG. 8).

Figure 11:
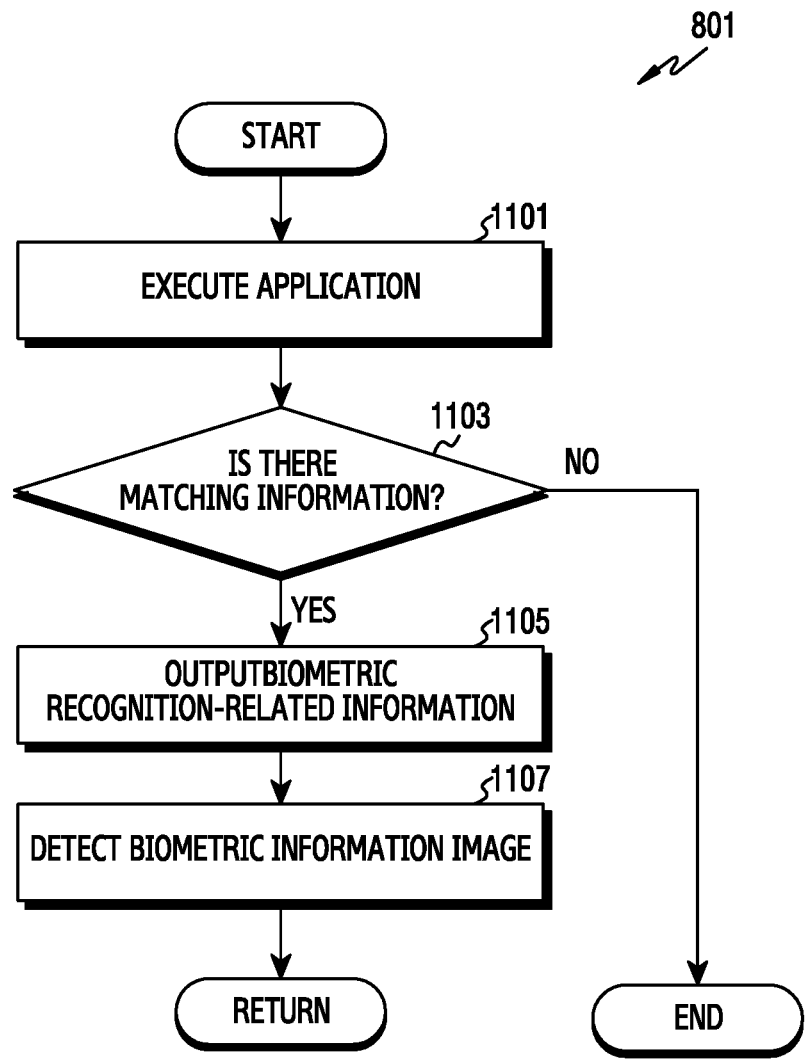
FIG. 11 illustrates a flowchart for detecting biometric information associated with an application in the electronic device according to various embodiments of the present disclosure.
Figure 12A:
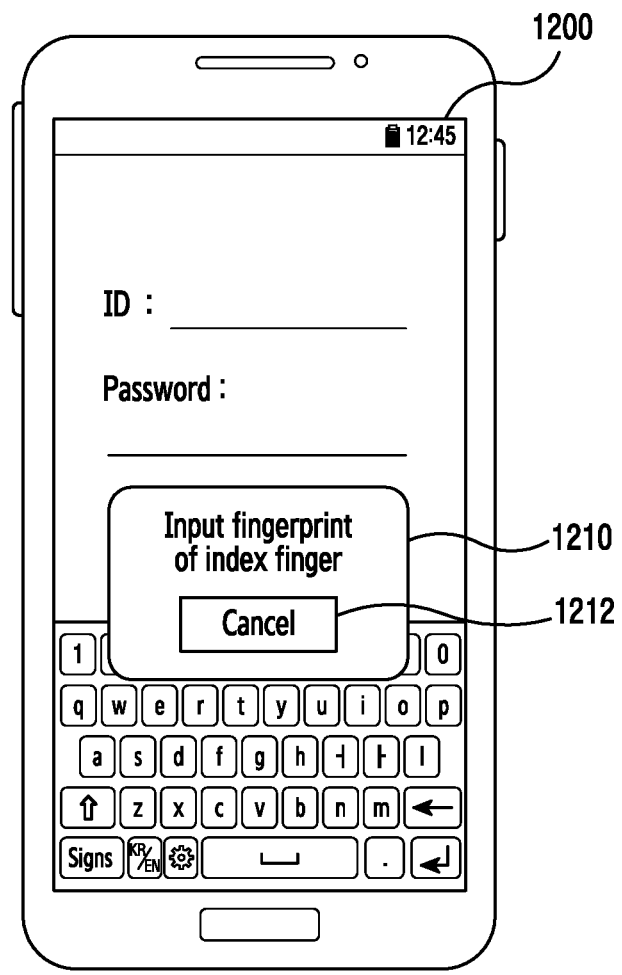
FIG. 12A and FIG. 12B illustrate screen configurations for obtaining application information associated with the biometric information in the electronic device according to various embodiments of the present disclosure.
Figure 12B:
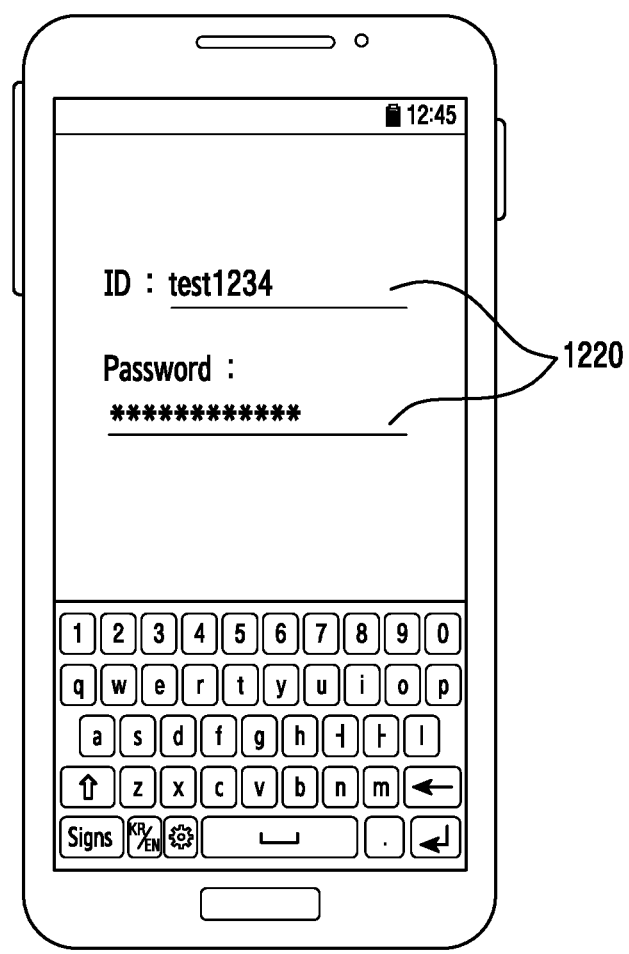

FIG. 11 illustrates a flowchart for detecting biometric information associated with an application in the electronic device according to various embodiments of the present disclosure. FIGS. 12A and 12B illustrate screen configurations for obtaining application information associated with the biometric information in the electronic device according to various embodiments of the present disclosure. The following description will be made of the operation of obtaining the biometric information in operation 801 of FIG. 8. In the following description, the electronic device may include at least some elements (e.g., the processor 120) of the electronic device 101 of FIG. 1.

Referring to FIG. 11, in operation 1101, the electronic device may execute at least one application among a plurality of applications installed in the electronic device. For example, when the processor 120 detects a user input with respect to any one of a plurality of application icons displayed on the standby screen, the processor 120 may execute an application corresponding to the icon of which the user input is detected. In this case, the processor 120 may control the display 160 so as to display a service screen (e.g., a graphical user interface or 'GUI') of the corresponding application.

The electronic device may verify whether any stored biometric information correlates with the application running in the electronic device in operation 1103. For example, the processor 120 may detect identification information of the application running in the second electronic device 201. The processor 120 may verify whether matching biometric information corresponding to the identification information of the application in the matching table stored in the memory 130 or the server 106.

If biometric information matched with the application exists in the electronic device, the electronic device may output information requesting the input of biometric information in operation 1105. For example, if there is a fingerprint image matched with the application running in the electronic device 101, the processor 120 may identify finger information of the fingerprint image (e.g., the type of finger corresponding to the fingerprint image), which is matched with the application. The processor 120 may control the display 160 so as to output a hint 1210 (e.g., a prompt or instruction) for correct input of the fingerprint image to be input by the user on at least a portion of the service screen 1200 (e.g., login screen) of the application, as shown in FIG. 12A. As an example, if the processor 120 detects an input onto the 'cancel' button 1212 of the hint 1210 displayed on the display 160, the processor 120 may determine that the fingerprint input will not be performed. In this case, the processor 120 may control the display 160 so as to display or maintain display of a virtual keypad so that the user may directly input login information of the application.

The electronic device may activate the biometric sensor to thus obtain user's biometric information in operation 1107. For example, if the information hint 1210 is displayed on the display 160, the processor 120 may perform control such that the biometric sensor 180 may be activated. The processor 120 may obtain the user's biometric information using the activated biometric sensor 180.

According to an embodiment, when the user's biometric information is obtained (e.g., operation 1107 in FIG. 11), the electronic device may detect content information associated with the obtained user's biometric information (e.g., operation 803 in FIG. 8). Subsequently, the information may be entered into the relevant portions of the application GUI, as seen for example in the ID and password 1220 entered in FIG. 12B.

Figure 13:
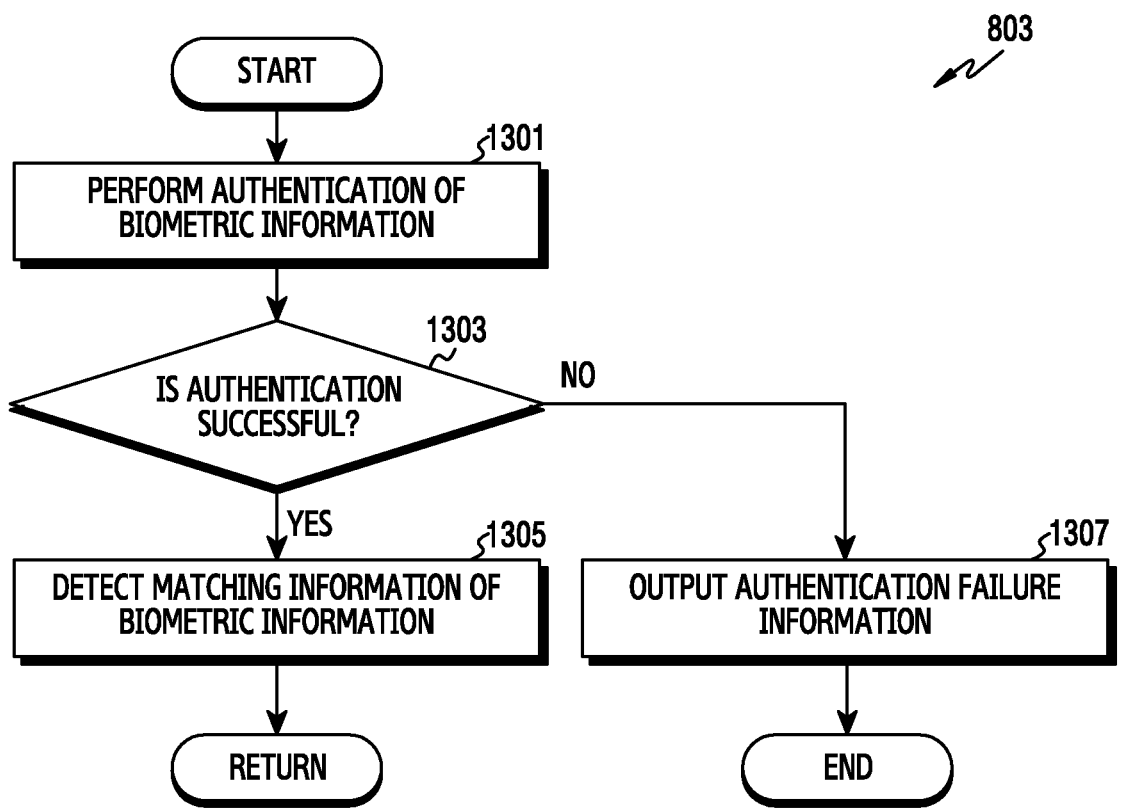
FIG. 13 illustrates a flowchart for detecting contents through authentication using biometric information in the electronic device according to various embodiments of the present disclosure.

FIG. 13 illustrates a flowchart for detecting contents through authentication of the biometric information in the electronic device according to various embodiments of the present disclosure. The following description will be made of the operation of detecting content information associated with the biometric information in operation 803 of FIG. 8. In the following description, the electronic device may include at least some elements (e.g., the processor 120) of the electronic device 101 of FIG. 1.

Referring to FIG. 13, when the electronic device obtains the user's biometric information (e.g., operation 801 in FIG. 8), the electronic device may perform user authentication using the biometric information in operation 1301. For example, when a user's fingerprint image is obtained, the processor 120 may verify whether a reference fingerprint image corresponding to the user's fingerprint image is stored among one or more reference fingerprint images in the memory 130. For example, the reference fingerprint image corresponding to the user's fingerprint image may include a reference fingerprint image of which the similarity with the user's fingerprint image is equal to or greater than a reference value.

The electronic device may verify whether or not the user authentication using the biometric information was successful in operation 1303. For example, if a stored reference fingerprint image matches the input user's fingerprint image, the processor 120 may determine that the user authentication is successful. If there is no reference fingerprint image matching the user's fingerprint image in the memory 130, the processor 120 may determine that the user authentication fails.

If the user authentication was successful using the biometric information, the electronic device may detect contents previously correlated or matched with the biometric information in operation 1305. For example, if the user authentication was successful using the fingerprint image obtained through the biometric sensor 180, the processor 120 may detect contents matched with the corresponding fingerprint image from the matching table stored in the memory 130 or the server 106. As an example, if the user authentication was successful using the fingerprint image corresponding to a thumb, the processor 120 may detect a first password corresponding to the fingerprint image of the thumb. As an example, if the user authentication was successful using the fingerprint image corresponding to the index finger, the processor 120 may detect a second password corresponding to the fingerprint image of an index finger.

If the user authentication using the biometric information has failed, the processor 120 may output an indication informing a user of the authentication failure information in operation 1307. For example, when the user authentication using the fingerprint image obtained through the biometric sensor 180 has failed, the processor 120 may control the display 160 so as to display an authentication failure message or a message requesting re-input of the biometric information. As an example, the processor 120 may detect the user biometric information again.

According to an embodiment, when the electronic device detects contents matched with the user's biometric information (e.g., operation 1305 in FIG. 13), the electronic device may output content information matched with the user's biometric information (e.g., operation 805 in FIG. 8).

Figure 14:
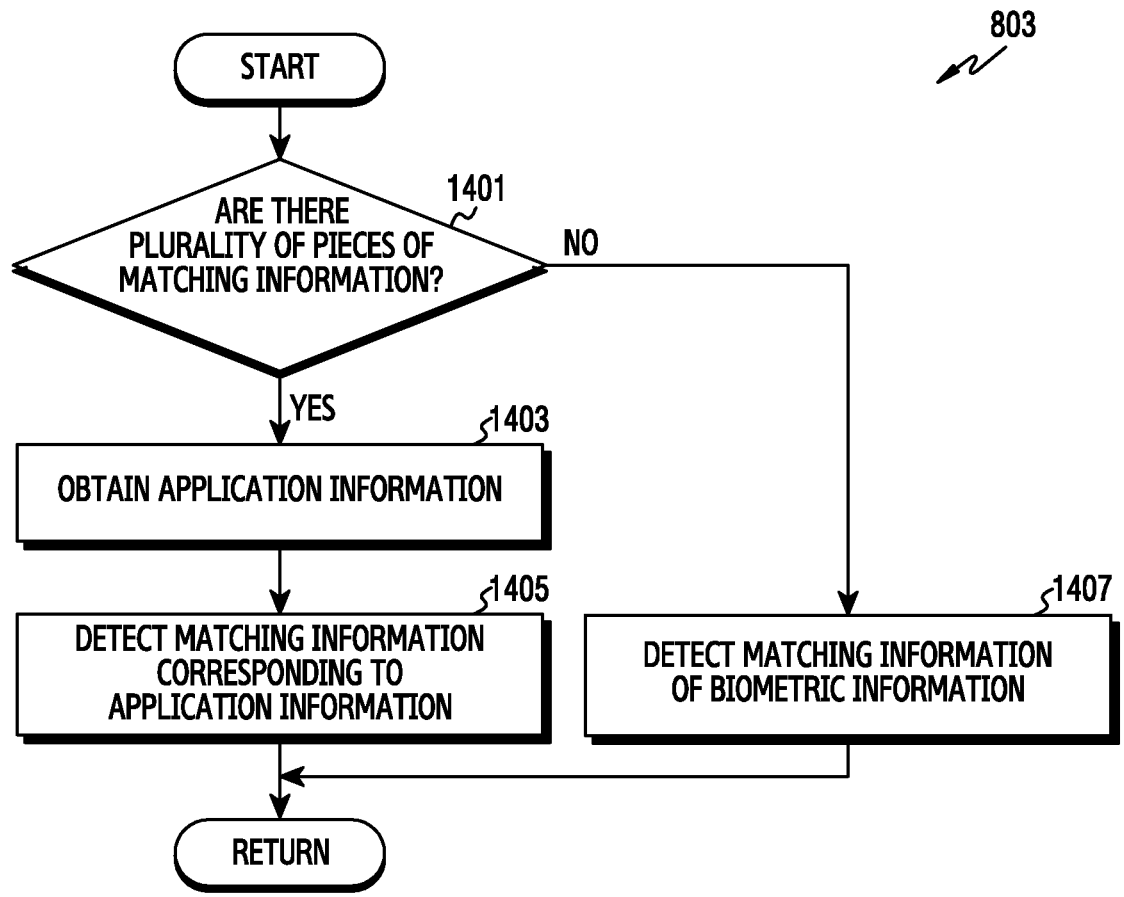
FIG. 14 illustrates a flowchart for detecting contents corresponding to an application in the electronic device according to various embodiments of the present disclosure.

FIG. 14 illustrates a flowchart for detecting contents corresponding to an application in the electronic device according to various embodiments of the present disclosure. The following description will be made of the operation of detecting content information associated with the biometric information in operation 803 of FIG. 8. In the following description, the electronic device may include at least some elements (e.g., the processor 120) of the electronic device 101 of FIG. 1.

Referring to FIG. 14, when the user's biometric information is obtained (e.g., operation 801 in FIG. 8), the electronic device may verify whether or not a plurality of contents are correlated or matched with the user's detected biometric information in operation 1401. For example, the processor 120 may verify whether or not a plurality of contents are matched with the user's biometric information from the memory 130 or the server 106, which stores the matching information of the biometric information and the contents.

In the case where a plurality of contents are matched with the user's biometric information, the electronic device may obtain information regarding an application running in the electronic device in operation 1403. For example, the processor 120 may detect identification information of an application running in the electronic device 101. As an example, when a plurality of applications are running in the electronic device 101, the processor 120 may detect identification information of an application of which the service screen is displayed on the display 160.

The electronic device, in operation 1405, may detect at least one content corresponding to the application information from among a plurality of contents matched with the user's biometric information. For example, in the case where a plurality of contents are matched with a fingerprint image of a pinky finger, which was obtained through the biometric sensor 180, the processor 120 may identify identification information of the application running in the electronic device 101. As an example, when a web page is executed in the electronic device 101, the processor 120 may detect login information (e.g., user identification information and authentication information) corresponding to the web page from among a plurality of contents matched with the fingerprint image of a pinky finger. As an example, when a gallery application is executed in the electronic device 101, the processor 120 may detect authentication information (e.g., a password) corresponding to the gallery application from among a plurality of contents matched with the fingerprint image of the pinky finger.

When one content is matched with the user's biometric information, the electronic device may detect contents matched with the user's biometric information in operation 1407. For example, if one content is matched with a fingerprint image of a ring finger, which has been obtained through the biometric sensor 180, the processor 120 may detect authentication information (e.g., a password) corresponding to a call application matched with the fingerprint image of the ring finger.

According to an embodiment, in the case where the electronic device detects matching information corresponding to the application information (e.g., operation 1405 in FIG. 14) or detects contents matched with the user's biometric information (e.g. operation 1407 in FIG. 14), the electronic device may output content information matched with the user's biometric information (e.g., operation 805 in FIG. 8).

Figure 15:
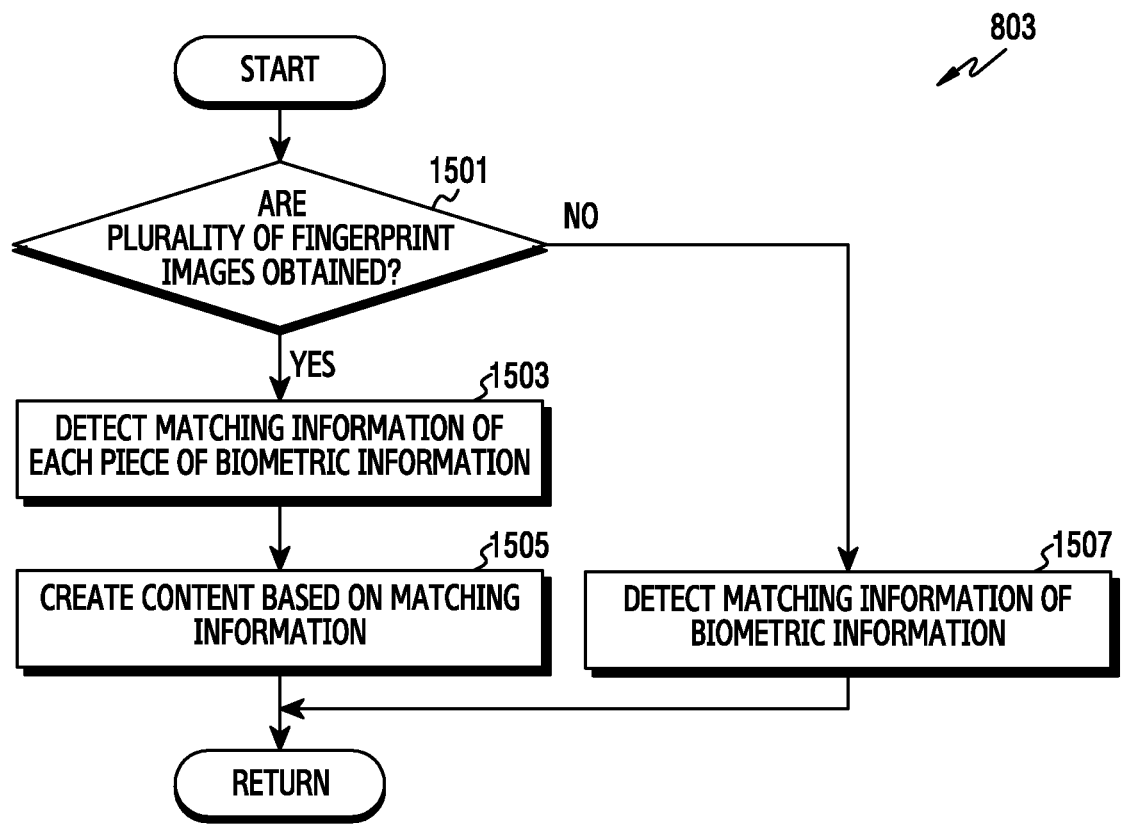
FIG. 15 illustrates a flowchart for detecting contents corresponding to a plurality of pieces of biometric information in the electronic device according to various embodiments of the present disclosure.

FIG. 15 illustrates a flowchart for detecting contents corresponding to a plurality of pieces of biometric information in the electronic device according to various embodiments of the present disclosure. The following description will be made of the operation of detecting content information associated with the biometric information in operation 803 of FIG. 8. In the following description, the electronic device may include at least some elements (e.g., the processor 120) of the electronic device 101 of FIG. 1.

Referring to FIG. 15, when the user's biometric information is obtained (e.g., operation 801 in FIG. 8), the electronic device may verify whether or not a plurality of pieces of biometric information have been obtained through a biometric sensor in operation 1501. For example, the processor 120 may verify whether or not a plurality of biometric markers (e.g., plurality of pieces of biometric information) have been obtained through the same type of biometric sensor. As an example, the processor 120 may verify whether or not a plurality of fingerprint images corresponding to different fingers have been detected through a fingerprint sensor. For example, the processor 120 may verify whether or not a plurality of different types of biometric information have been obtained through a plurality of different types of biometric sensors. As an example, the processor 120 may verify whether or not a fingerprint image and an iris image have been obtained through a fingerprint sensor and an iris sensor.

If a plurality of biometric markers have been obtained through the biometric sensor, the electronic device may detect contents matched with each respective biometric marker in operation 1503. For example, in the case where a plurality of fingerprint images are obtained, the processor 120 may detect a first content corresponding to a first fingerprint image and a second content corresponding to a second fingerprint image, as detected from the matching table stored in the memory 130 or the server 106. For example, when a fingerprint image and an iris image are obtained through the biometric sensor 180, the processor 120 may detect a third content matched with the fingerprint image and a fourth content matched with the iris image from the matching table stored in the memory 130 or the server 106.

The electronic device may generate a single content based on a plurality of contents matched with a plurality of pieces of biometric information in operation 1505. For example, when a plurality of fingerprint images are obtained, the processor 120 may create a password corresponding to the web page by combining the first content matched with the first fingerprint image and the second content matched with the second fingerprint image. For example, when a fingerprint image and an iris image are obtained through the biometric sensor 180, the processor 210 may create login information (e.g., an ID and a password) corresponding to the web page by combining a third content matched with the fingerprint image and a fourth content matched with the iris image.

In contrast, when one single piece of biometric information is detected through the biometric sensor rather than a plurality, the electronic device may detect any contents matched with the user's single biometric marker, as seen in operation 1507.

According to an embodiment, in the case where the electronic device creates contents based on the matching information of the user's biometric information (e.g., operation 1505 in FIG. 15) or detects contents matched with the user's biometric information (e.g., operation 1507 in FIG. 15), the electronic device may output content information matched with the user's biometric information (e.g., operation 805 in FIG. 8).

According to various embodiments of the present disclosure, when a plurality of pieces of biometric information are obtained through the biometric sensor, the electronic device may verify whether or not the contents matched with the respective pieces of biometric information correlate with each other. If the contents matched with the respective pieces of biometric information correlate with each other, the electronic device may create a single content by combining the contents matched with the respective pieces of biometric information. As an example, if the respective pieces of biometric information are matched with the same application identification information, the processor 120 may determine that the contents matched with the respective pieces of biometric information correlate with each other. As an example, if the respective pieces of biometric information are matched with different pieces of application identification information, the processor 120 may determine that the contents matched with the respective pieces of biometric information do not correlate with each other. In this case, the processor 210 may perform control such that the contents matched with the respective pieces of biometric information are output independently from each other.

Figure 16:
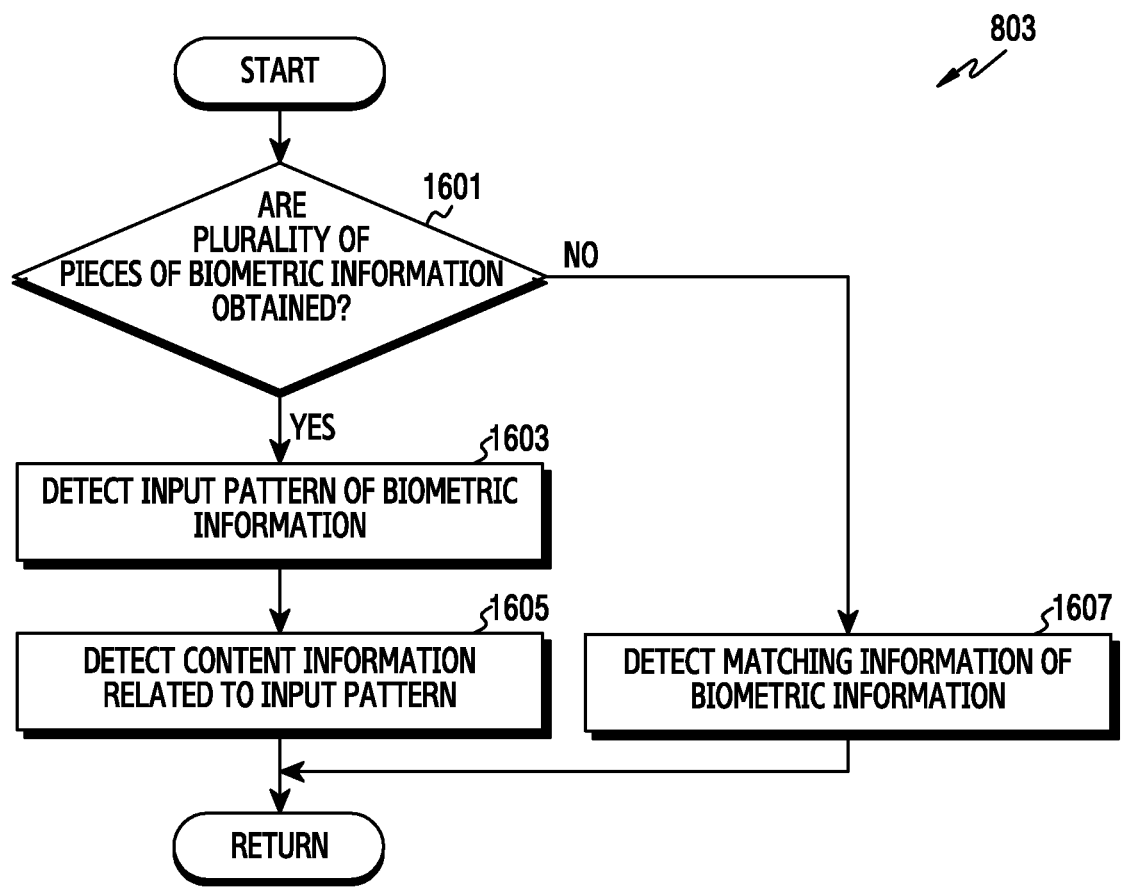
FIG. 16 illustrates a flowchart for detecting contents corresponding to an input pattern of the biometric information in the electronic device according to various embodiments of the present disclosure.

FIG. 16 illustrates a flowchart for detecting contents corresponding to an input pattern of the biometric information in the electronic device according to various embodiments of the present disclosure. The following description will be made of the operation of detecting content information associated with the biometric information in operation 803 of FIG. 8. In the following description, the electronic device may include at least some elements (e.g., the processor 120) of the electronic device 101 of FIG. 1.

Referring to FIG. 16, when the user's biometric information is obtained (e.g., operation 801 in FIG. 8), the electronic device may verify whether or not a plurality of biometric markers (e.g., a plurality of pieces of biometric information) have been detected through a biometric sensor in operation 1601. For example, the processor 120 may verify whether or not a plurality of pieces of biometric information have been obtained through the same type of biometric sensor. For example, the processor 120 may verify whether or not a plurality of different types of biometric information have been obtained through a plurality of different types of biometric sensors.

If a plurality of pieces of biometric information have been detected through the biometric sensor, the electronic device may detect an input pattern of the biometric information in operation 1603. For example, in the case where a plurality of pieces of biometric information are acquired through the same type of biometric sensor, the processor 120 may detect an input pattern corresponding to the acquisition sequence of the biometric information. As an example, when a plurality of fingerprint images are acquired through a fingerprint sensor, the processor 120 may create an input pattern of the biometric information corresponding to the detection sequence of the fingerprint images. For example, when a plurality of pieces of biometric information are acquired through various types of biometric sensors, the processor 120 may detect an input pattern corresponding to the acquisition sequence of the biometric information and the type of biometric information. As an example, when one or more fingerprint images and one or more iris images are acquired through a fingerprint sensor and an iris sensor, the processor 120 may create an input pattern of the biometric information corresponding to the detection sequence of the fingerprint images and the iris images.

The electronic device may detect contents previously correlated and/or matched with the input pattern corresponding to the biometric information in operation 1605. For example, the processor 120 may detect contents matched with the input pattern corresponding to the biometric information from the matching table stored in the memory 130 or the server 106.

When a single piece of biometric information is detected through a biometric sensor, the electronic device may detect contents matched with the user's single biometric information in operation 1607.

According to an embodiment, in the case where the electronic device detects contents matched with the input pattern of the biometric information (e.g., operation 1605 in FIG. 16) or detects contents matched with the user's biometric information (e.g., operation 1607 in FIG. 16), the electronic device may output content information matched with the user's biometric information (e.g., operation 805 in FIG. 8).

Figure 17:
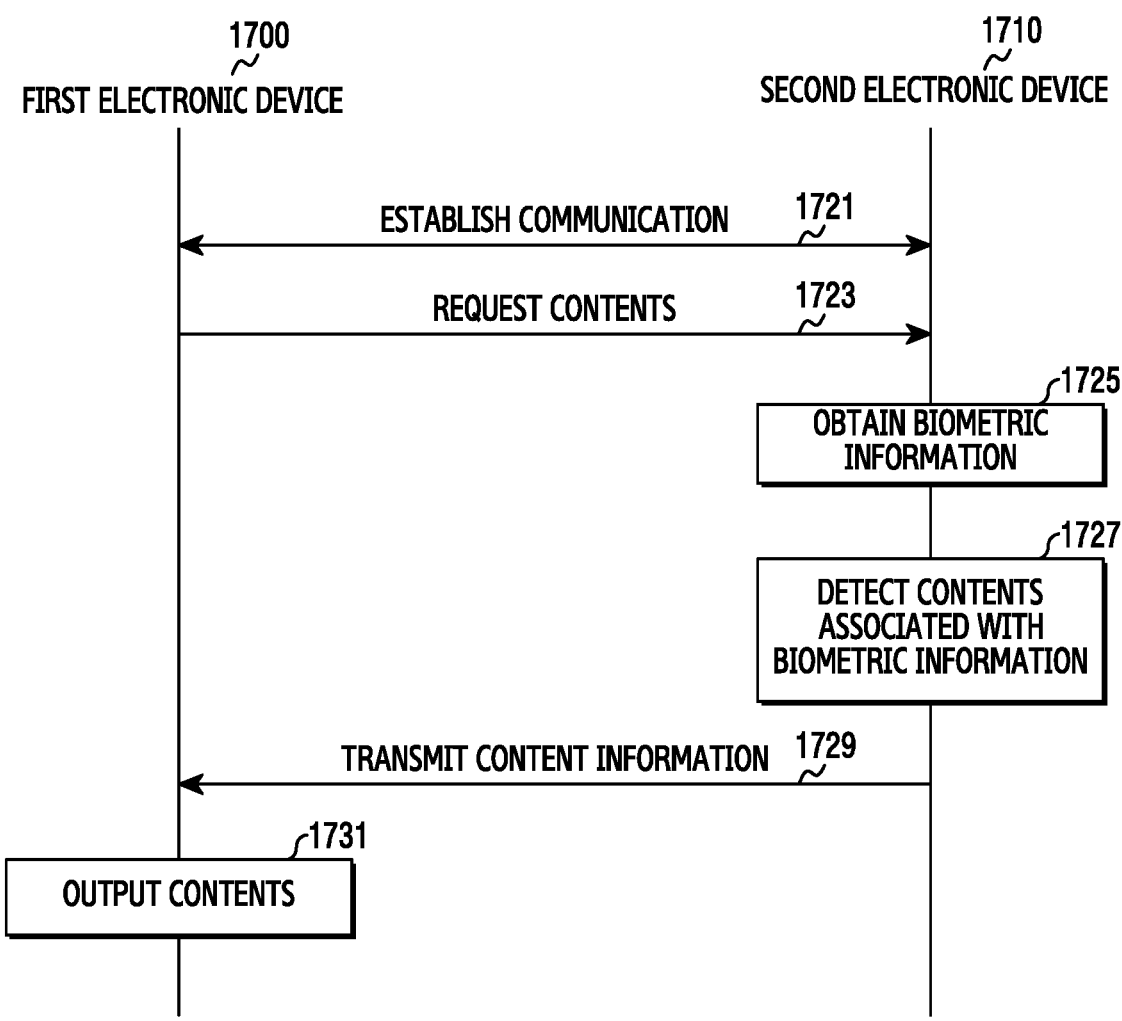
FIG. 17 illustrates a signal flowchart for obtaining contents corresponding to the biometric information through another electronic device according to various embodiments of the present disclosure.

FIG. 17 illustrates a signal flowchart for acquiring contents corresponding to the biometric information through another electronic device according to various embodiments of the present disclosure.

According to an embodiment, a first electronic device 1700 and a second electronic device 1710 may be connected with each other through wireless communication (see 1721). For example, the first electronic device 1700 may establish communication link with the second electronic device 1710 using short-range communication or cellular communication.

According to an embodiment, when a content request signal is received from the first electronic device 1700 (see 1723), the second electronic device 1710 may acquire biometric information (see 1725). The second electronic device 1710 may detect contents matched with the biometric information from the memory of the second electronic device 1710 (see 1727). For example, when a door lock device (the first electronic device 1700) detects the occurrence of an event for password input, it may transmit a password request signal to the pre-registered second electronic device 1710. When the password request signal is received, the second electronic device 1710 may activate a biometric sensor (e.g., a fingerprint sensor) to thus acquire user's biometric information (e.g., a fingerprint image). The second electronic device 1710 may obtain a password matched with the user's biometric information acquired through the biometric sensor.

According to an embodiment, when the content matched with the biometric information is received from the second electronic device 1710 (see 1729), the first electronic device 1700 may output the corresponding content (see 1731). For example, the door lock device (the first electronic device 1700) may attempt to release the locked state of the door lock device using the password provided by the second electronic device 1710. As an example, if the password received from the second electronic device 1710 matches a reference password stored in the door lock device, the door lock device (the first electronic device 1700) may release the locked state thereof.

Figure 18:
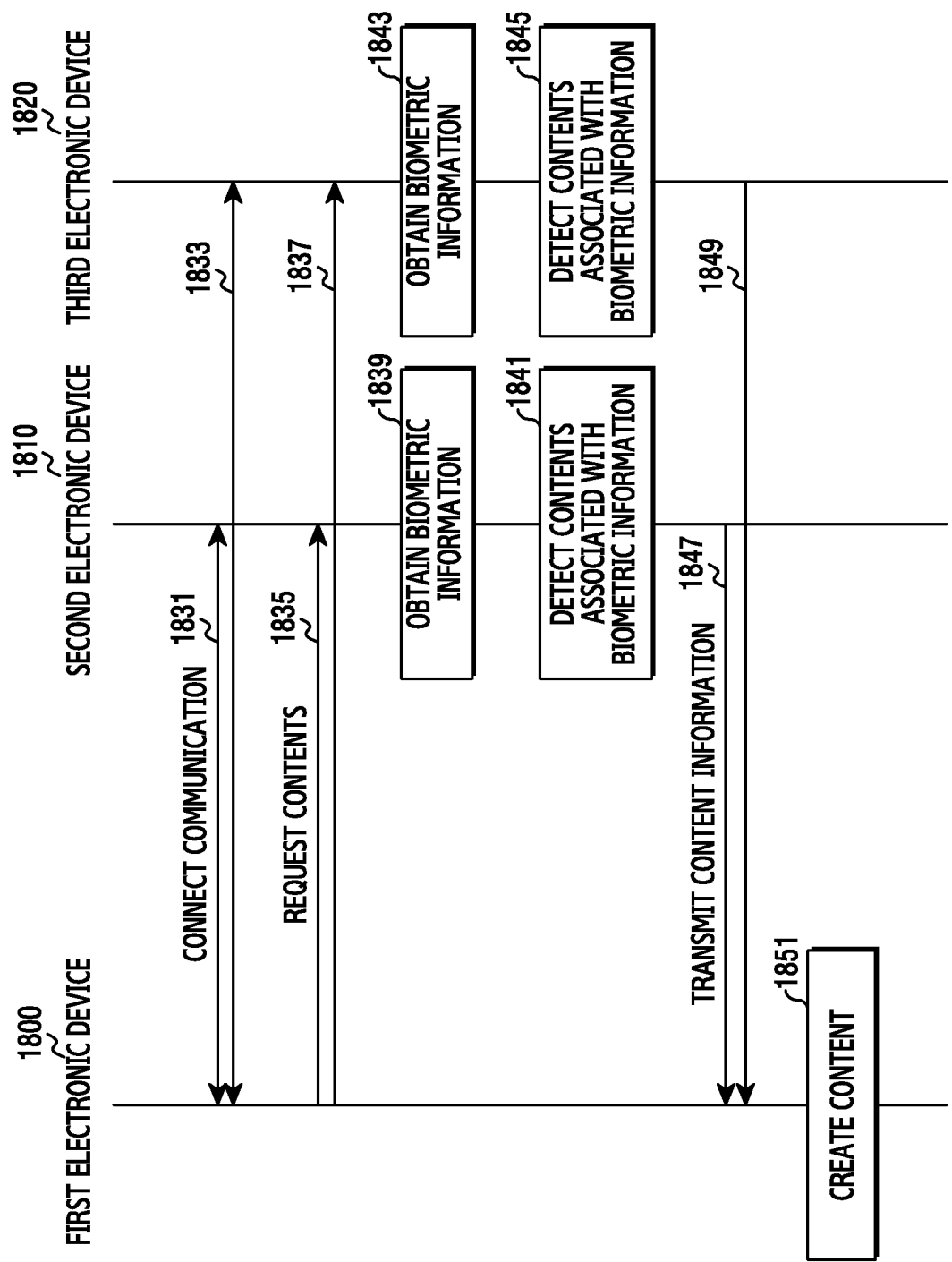
FIG. 18 illustrates a signal flowchart for obtaining contents corresponding to the biometric information by the electronic devices interworking with each other according to various embodiments of the present disclosure.

FIG. 18 illustrates a signal flowchart for acquiring contents corresponding to the biometric information by the electronic devices interworking with each other according to various embodiments of the present disclosure.

According to an embodiment, a first electronic device 1800, a second electronic device 1810, and a third electronic device 1820 may be connected using wireless communication (see 1831 and 1833). For example, the first electronic device 1800 may establish communication link with the second electronic device 1810 and the third electronic device 1820 using short-range communication (e.g., Bluetooth, a wireless LAN, and BLE).

According to an embodiment, when the first electronic device 1800 detects the occurrence of an event for outputting contents, the first electronic device 1800 may transmit a content request signal to the second electronic device 1810 and the third electronic device 1820 (see 1835 and 1837).

According to an embodiment, when the second electronic device 1810 receives a content request signal from the first electronic device 1800 (see 1835), the second electronic device 1810 may acquire biometric information (see 1839). The second electronic device 1810 may detect contents matched with the biometric information from the memory of the second electronic device 1810 (see 1841). For example, the contents matched with the biometric information may include at least a part of the contents utilized by the first electronic device 1800.

According to an embodiment, when the third electronic device 1820 receives a content request signal from the first electronic device 1800 (see 1837), the third electronic device 1820 may acquire biometric information (see 1843). The third electronic device 1820 may detect contents matched with the biometric information from the memory of the third electronic device 1820 (see 1845). For example, the contents matched with the biometric information may include at least another part of the contents utilized by the first electronic device 1800.

According to an embodiment, when the first electronic device 1800 receives the contents matched with the biometric information from the second electronic device 1810 and the third electronic device 1820 (see 1847 and 1849), the first electronic device 1800 may create a new content by combining the corresponding contents (see 1851). For example, a safe (the first electronic device 1800) may combine the contents provided from the second electronic device 1810 and the third electronic device 1820 to thus create a password for releasing the locked state thereof. As an example, the safe (the first electronic device 1800) may release the locked state thereof using a password created by combining contents received from the second electronic device 1810 and the third electronic device 1820.

According to various embodiments of the present disclosure, the electronic device may create a new content by combining the contents matched with the biometric information detected by the electronic device and the contents provided from the external device.

According to various embodiments of the present disclosure, an operating method of an electronic device may include: receiving biometric information through a biometric sensor electrically connected to the electronic device; when the received biometric information is authenticated, detecting at least one content that correlates with the received biometric information; and outputting the detected at least one content that correlates with the biometric information.

According to various embodiments, the received biometric information comprises at least one of a fingerprint, an iris, a retina, or a vein.

According to various embodiments, further comprising: activating the biometric sensor in response to detecting an event in which biometric information is to be acquired.

According to various embodiments, the activating of the biometric sensor may include activating the biometric sensor when a content request signal is received from an external device.

According to various embodiments, the detecting of the content may include: identifying an application executing in the electronic device; and detecting at least one content matching the application and the received biometric information.

According to various embodiments, wherein the received biometric information includes a plurality of biometric markers, the detecting of the content may include: detecting contents matching each respective biometric marker; and generating a new content based on the detected contents.

According to various embodiments, the detecting of the content may include: when a plurality of biometric markers are received through the biometric sensor, detecting an input pattern corresponding to the plurality of biometric markers; and detecting contents corresponding to the detected input pattern.

According to various embodiments, the input pattern may include at least one of an acquisition sequence of the plurality of biometric markers, and a type of biometric information for each of the plurality of biometric markers.

According to various embodiments, the outputting of the contents may include displaying the contents matching the biometric information on the display electrically connected to the electronic device.

According to various embodiments, the method may further include transmitting the contents matching the biometric information to at least one external device.

The electronic device and operating method thereof, according to various embodiments, may manage the contents (e.g., passwords) so as to be matched with the user's biometric information (e.g. fingerprints, irises, retinas, veins, etc.), thereby allowing the user of the electronic device to easily detect the contents using the biometric information and improving the security of the contents through the biometric information.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 210), may cause the one or more processors to execute the function corresponding to the instruction. The computer-readable storage medium may be, for example, the memory 230.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments disclosed herein are provided merely to easily describe technical details of the present disclosure and to help the understanding of the present disclosure, and are not intended to limit the various embodiments of the present disclosure. Therefore, it should be construed that all modifications and changes or various other embodiments based on the technical idea of various embodiments of the present disclosure fall within the various embodiments of the present disclosure.

What is claimed is:

1. An electronic device comprising:
   a biometric sensor;
   at least one processor; and
   a memory electrically coupled to the at least one processor, storing biometric information associated with an application or a web page, a plurality of contents correlated to the biometric information, and instructions executable by the at least one processor to:
   execute the application or the web page associated with biometric information,
   receive the biometric information of a user through the biometric sensor and detect that the received biometric information is authenticated,
   detect whether the biometric information includes multiple biometric inputs or a singular biometric input, and
   based on detecting that the biometric information includes the singular biometric input:
      identify at least one content associated with the singular biometric input, in addition to the application or the web page from among the stored plurality of contents, and
      display a screen including a security field in which the at least one content is entered, wherein the identified at least one content correlates with the singular biometric input and the application or the web page, based on detecting that biometric information includes the multiple biometric inputs:
identify contents from among the stored plurality of contents associated with a first biometric input included in the multiple biometric inputs, wherein the identified contents includes multiple authentication information entries,
select a first authentication information entry from among the identified contents, and authenticating the user for a first application using the selected first authentication information entry,
combine the identified plurality of contents into a single authentication credential, and
display the screen including the security field in which the combined single authentication credential is entered.

2. The electronic device of claim 1, wherein the biometric sensor is configured to detect at least one of a fingerprint, an iris, a retina, or a vein.

3. The electronic device of claim 1, wherein the instructions are further executable by the at least one processor to:
activate the biometric sensor in response to an occurrence of an event in which the application or the web page associated with the biometric information is executed.

4. The electronic device of claim 3, further comprising a communication interface, wherein the instructions are further executable by the at least one processor to:
activate the biometric sensor when a content request signal is received through the communication interface after the application or the web page associated with the biometric information is executed.

5. The electronic device of claim 1, wherein the identified plurality of contents associated with each biometric input included in the multiple biometric inputs include multiple text strings,
wherein the identified plurality of contents are combined into a single authentication credential by combining the multiple text strings into a single combined text string, and
wherein the combined single authentication credential is entered by inputting the single combined text string into the security field.

6. The electronic device of claim 1, wherein the instructions are further executable by the at least one processor to:
based on detecting that the biometric information includes the multiple biometric inputs, detect an input pattern based on a sequence by which each biometric input of the multiple biometric inputs is entered; and
identify another at least one content pre-stored in the memory in association with the input pattern.

7. The electronic device of claim 1, further comprising a communication interface, wherein the instructions are further executable by the at least one processor to:
control the communication interface to transmit the at least one content matching the biometric information and the application or the web page to an external device through the communication interface.

8. A method in an electronic device, comprising:
storing biometric information and a plurality of contents, wherein the biometric information is associated with an application or a web page, and the plurality of contents are correlated to the biometric information;
executing an application or a web page associated with biometric information;
receiving first biometric information of a user through a biometric sensor electrically coupled with the electronic device and detecting that the received first biometric information is authenticated;
determining that the first biometric information includes a singular biometric input;
based on determining that the first biometric information includes the singular biometric input:
identifying at least one content associated with the singular biometric input, in addition to the application or the web page from among the stored plurality of contents, and
displaying a screen including a security field in which the at least one content is entered, wherein the identified at least one content correlates with the singular biometric input and the application or the web page;
receiving second biometric information of the user through the biometric sensor electrically coupled with the electronic device and detecting that the received second biometric information is authenticated;
determining that the second biometric information includes multiple biometric inputs; and
based on detecting that second biometric information includes the multiple biometric inputs:
identifying contents from among the stored plurality of contents associated with each biometric input included in the multiple biometric inputs, wherein the identified contents includes multiple authentication information entries,
selecting a first authentication information entry from among the identified contents, and authenticating the user for a first application using the selected first authentication information entry,
combining the identified plurality of contents into a single authentication credential, and
displaying the screen including the security field in which the combined single authentication credential is entered.

9. The method of claim 8, wherein the received biometric information comprises at least one of a fingerprint, an iris, a retina, or a vein.

10. The method of claim 8, further comprising:
activating the biometric sensor in response to an occurrence of an event in which the application or the web page associated with the biometric information is executed.

11. The method of claim 10, wherein the activating of the biometric sensor comprises:
activating the biometric sensor when a content request signal is received from an external device after the application or the web page associated with the biometric information is executed.

12. The method of claim 8, wherein the identified plurality of contents associated with each biometric input included in the multiple biometric inputs include multiple text strings,
wherein the identified plurality of contents are combined into the single authentication credential by combining the multiple text strings into a single combined text string, and
wherein the combined single authentication credential is entered by inputting the single combined text string into the security field.

13. The method of claim 8, further comprising:
based on detecting that the biometric information includes the multiple biometric inputs, detecting an input pattern based on a sequence by which each biometric input of the multiple biometric inputs is entered; and
identifying another at least one content pre-stored in a memory in association with the input pattern.

14. The method of claim 8, further comprising:
transmitting the at least one content matching the biometric information and the application or web page to an external device.

* * * * *